(12) United States Patent
Araki et al.

(10) Patent No.: US 11,905,357 B2
(45) Date of Patent: Feb. 20, 2024

(54) MOLDED BALE OF RUBBER COMPOSITION, METHOD FOR PRODUCING MOLDED BALE OF RUBBER COMPOSITION, CROSSLINKING RUBBER COMPOSITION, AND TREAD FOR TIRE

(71) Applicant: Asahi Kasei Kabushiki Kaisha, Tokyo (JP)

(72) Inventors: Yoshifumi Araki, Tokyo (JP); Atsushi Yasumoto, Tokyo (JP); Tomohiro Kondo, Tokyo (JP); Akitomo Kikuchi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 203 days.

(21) Appl. No.: 17/356,872

(22) Filed: Jun. 24, 2021

(65) Prior Publication Data

US 2021/0403628 A1    Dec. 30, 2021

(30) Foreign Application Priority Data

Jun. 26, 2020  (JP) .................................. 2020-110775
May 12, 2021  (JP) .................................. 2021-081156

(51) Int. Cl.
| | | |
|---|---|---|
| *C08F 279/02* | (2006.01) | |
| *C08K 3/08* | (2006.01) | |
| *C08K 5/01* | (2006.01) | |
| *B60C 11/00* | (2006.01) | |
| *B60C 1/00* | (2006.01) | |

(52) U.S. Cl.
CPC .......... *C08F 279/02* (2013.01); *B60C 1/0016* (2013.01); *B60C 11/0008* (2013.01); *C08K 3/08* (2013.01); *C08K 5/01* (2013.01); *B60C 2011/0025* (2013.01); *C08K 2003/0881* (2013.01)

(58) Field of Classification Search
CPC . C08F 279/02; B60C 1/0016; B60C 11/0008; B60C 2011/0025; C08K 3/08; C08K 5/01; C08K 2003/0881
See application file for complete search history.

(56) References Cited

U.S. PATENT DOCUMENTS

| | | |
|---|---|---|
| 2009/0013597 A1 | 1/2009 | Orton |
| 2018/0201066 A1 | 7/2018 | Adachi et al. |
| 2020/0239675 A1 | 7/2020 | Tardif et al. |

FOREIGN PATENT DOCUMENTS

| | | |
|---|---|---|
| JP | 2018-168245 | 11/2018 |
| WO | 2013/098056 A1 | 7/2013 |
| WO | 2017/014282 A1 | 1/2017 |
| WO | 2019/078083 A1 | 4/2019 |
| WO | 2019/151126 A1 | 8/2019 |
| WO | 2019/151127 A1 | 8/2019 |

*Primary Examiner* — Angela C Scott
(74) *Attorney, Agent, or Firm* — Morgan, Lewis & Bockius LLP

(57) ABSTRACT

A molded bale of a rubber composition, containing: a rubber-like polymer (A) having an iodine value of 10 to 250, 3% by mass or more of an ethylene structure, and less than 10% by mass of a vinyl aromatic monomer block; and titanium (C), in which a content of the titanium (C) is 3 ppm or more and 120 ppm or less, and a content of aluminum (B) is less than 2 ppm.

17 Claims, No Drawings

MOLDED BALE OF RUBBER COMPOSITION, METHOD FOR PRODUCING MOLDED BALE OF RUBBER COMPOSITION, CROSSLINKING RUBBER COMPOSITION, AND TREAD FOR TIRE

BACKGROUND OF THE INVENTION

Field of the Invention

The present invention relates to a molded bale of a rubber composition, a method for producing a molded bale of a rubber composition, a crosslinking rubber composition, and a tread for a tire.

Description of the Related Art

In recent years, in the fields of rubber materials for tire treads, sheets, films and asphalt modification, a rubber composition containing a rubber-like polymer having an ethylene structure and containing a crosslinkable unsaturated group introduced therein has been proposed for purposes of increasing mechanical strength and permanent compression set (see, for example, International Publication Nos. WO2019/151126, WO2019/151127, and WO2019/078083).

The conventionally proposed rubber composition containing a rubber-like polymer having an ethylene structure and containing a crosslinkable unsaturated group introduced therein has, however, problems of the tendencies of easily contaminating a used mold, of easily increasing viscosity of the rubber composition over time, and of easily peeling the rubber composition off from a molded bale. Besides, the present inventors have found that a molded bale of a rubber composition containing a rubber-like polymer having an ethylene structure has problems that a packaging sheet used for wrapping the molded bale is easily broken during transport, and that the molded bale wrapped with the sheet tends to be difficult to carry. This is probably because the packaging sheet is difficult to adhere to the molded bale of the rubber composition when the rubber-like polymer has an ethylene structure.

Therefore, an object of the present invention is to provide a molded bale of a rubber composition that suppresses contamination of a used mold, suppresses an increase in viscosity of the rubber composition over time, suppresses peeling the rubber composition off from the molded bale, and is easy to cause a packaging sheet to adhere to the molded bale.

SUMMARY OF THE INVENTION

The present inventors has earnestly studied to solve the above-described problems of the conventional techniques. As a result, the present inventor has found that in a rubber composition containing a rubber-like polymer having a specific structure, by specifying a titanium content and an aluminum content respectively to prescribed ranges, contamination of a used mold can be suppressed, an increase in viscosity of the rubber composition over time can be suppressed, peeling off the rubber composition from the molded bale can be suppressed, and a packaging sheet can be easily adhered to the molded bale, and thus, the present invention has been accomplished.

Specifically, the present invention provides the following:

[1] A molded bale of a rubber composition, comprising:
a rubber-like polymer (A) comprising an iodine value of 10 to 250, 3% by mass or more of an ethylene structure, and less than 10% by mass of a vinyl aromatic monomer block; and
titanium (C),
wherein a content of the titanium (C) is 3 ppm or more and 120 ppm or less, and
a content of aluminum (B) is less than 2 ppm.

[2] The molded bale according to [1], wherein the rubber-like polymer (A) is a hydrogenated product of a conjugated diene-based polymer.

[3] The molded bale according to [1] or [2], wherein the rubber-like polymer (A) comprises 5% by mass or more of a vinyl aromatic monomer unit.

[4] The molded bale according to any one of [1] to [3], wherein the rubber-like polymer (A) comprises a nitrogen atom.

[5] The molded bale according to any one of [1] to [4], wherein the rubber-like polymer (A) has a modification ratio measured by column adsorption GPC of 40% by mass or more.

[6] The molded bale according to any one of [1] to [5], further comprising 30% by mass or less of a rubber softener (D).

[7] The molded bale according to any one of [1] to [6], comprising 0.05% by mass or more and 1.5% by mass or less of water.

[8] A method for producing the molded bale of the rubber composition according to any one of [1] to [7], comprising the steps of:
polymerizing at least a conjugated diene monomer in a solution to obtain rubber-like polymer (A);
adding titanium (C) to the resultant solution comprising the rubber-like polymer (A) to obtain a rubber composition; and
molding the resultant rubber composition.

[9] The method for producing the molded bale according to [8], in which hydrogenation process is performed with a hydrogenation catalyst having an aluminum content of 0.05 mol or less per mol of the titanium content.

[10] The method for producing the molded bale according to [8] or [9], further comprising a step of removing a solvent from the solution by steam stripping.

[11] A crosslinking rubber composition, comprising:
the rubber composition of the molded bale according to any one of [1] to [7]; and
a crosslinking agent,
wherein a content of the crosslinking agent is 0.1 parts by mass or more and 20 parts by mass or less based on 100 parts by mass of a rubber component.

[12] A tread for a tire, containing the rubber composition of the molded bale according to any one of [1] to [7].

According to the present invention, a rubber composition that is difficult to contaminate a used mold, is difficult to increase in viscosity of the rubber composition over time, is difficult to peel off from the molded bale, and is easy to cause a packaging sheet to adhere to the molded bale is obtained.

DETAILED DESCRIPTION OF THE PREFERRED EMBODIMENT

Now, an embodiment for practicing the present invention (hereinafter referred to as the "present embodiment") will be described in detail.

It is noted that the following embodiment is merely illustrative for describing the present invention, and that the present invention is not limited to the following embodiment. The present invention can be practiced with modifications appropriately made within the scope thereof.

[Molded Bale of Rubber Composition]

A molded bale of a rubber composition of the present embodiment containing: a rubber-like polymer (A) comprising an iodine value of 10 to 250, 3% by mass or more of an ethylene structure, and less than 10% by mass of a vinyl aromatic monomer block; and titanium (C), in which a content of the titanium (C) is 3 ppm or more and 120 ppm or less, and a content of aluminum (B) is less than 2 ppm.

(Rubber-Like Polymer (A))

The rubber-like polymer (A) contained in the rubber composition contained in the molded bale of the present embodiment (hereinafter referred to as the rubber composition of the present embodiment) is a rubber-like polymer comprising an iodine value of 10 to 250, 3% by mass or more of an ethylene structure, and less than 10% by mass of vinyl aromatic monomer block.

<Iodine Value>

The iodine value of the rubber-like polymer (A) contained in the rubber composition of the present embodiment is 10 to 250.

The iodine value is 10 or more from the viewpoints of ease of crosslinking, and adhesiveness of a packaging sheet to the molded bale of the rubber composition of the present embodiment. The iodine value is preferably 15 or more, more preferably 30 or more, further preferably 50 or more, and still further preferably 70 or more.

On the other hand, the iodine value is 250 or less from the viewpoints of weather resistance and resistance to degradation over time of the rubber-like polymer (A), and mechanical strength and abrasion resistance obtained in the form of a tire. The iodine value is preferably 170 or less, more preferably 140 or less, further preferably 110 or less, and still further preferably 80 or less.

The iodine value can be measured in accordance with a method described in "JIS K 0070: 1992".

The iodine value is a value, in terms of the weight in grams of iodine, corresponding to an amount of halogen reacting with 100 g of a target substance, and hence the iodine value is expressed in the unit of "g/100 g".

Since a conjugated diene monomer unit has a double bond, for example, if a conjugated diene monomer and a vinyl aromatic monomer are copolymerized in a method for producing the rubber-like polymer (A) described below, the iodine value of the rubber-like polymer (A) is lower when the content of a conjugated monomer unit is lower. Alternatively, if a conjugated diene monomer unit is hydrogenated, the iodine value is lower as a hydrogenation rate is higher.

The iodine value of the rubber-like polymer (A) can be controlled to fall in the above-described numerical range by adjusting the amount of a conjugated diene monomer or the like having an unsaturated bond, polymerization conditions such as polymerization time and a polymerization temperature, and conditions employed in hydrogenation process such as a hydrogenation amount and hydrogenation time.

<Ethylene Structure Content>

The rubber-like polymer (A) contained in the rubber composition of the present embodiment has 3% by mass or more of an ethylene structure.

When the ethylene structure is 3% by mass or more, a fracture property necessary as a rubber for a tire is easily exhibited. The ethylene structure is preferably 5% by mass or more, more preferably 30% by mass or more, and further preferably 40% by mass or more.

The ethylene structure is preferably 90% by mass or less, more preferably 80% by mass or less, and further preferably 70% by mass or less.

When the ethylene structure is 90% by mass or less, the rubber composition of the present embodiment is excellent in rubber elasticity.

The ethylene structure in the rubber-like polymer (A) encompasses all ethylene structures such as an ethylene structure obtained by copolymerizing an ethylene monomer, and an ethylene structure obtained by polymerizing a conjugated diene monomer and then hydrogenating the resultant. For example, when a 1,4-butadiene unit is hydrogenated, two ethylene structures are obtained, and when a 1,4-isoprene unit is hydrogenated, one propylene structure and one ethylene structure are obtained.

The ethylene structure content of the rubber-like polymer (A) can be measured by a method described in Examples below, and can be controlled to fall in the above-described numerical range by adjusting an amount of ethylene added, an amount of a conjugated diene monomer added, a hydrogenation rate, and the like.

<Vinyl Aromatic Monomer Block Content>

The rubber-like polymer (A) has a vinyl aromatic monomer block content of less than 10% by mass (vinyl aromatic monomer block <10% by mass).

The vinyl aromatic monomer block refers to a block containing a chain of eight or more aromatic vinyl monomer units.

When the vinyl aromatic monomer block content is less than 10% by mass, the rubber composition of the present embodiment easily exhibits good peeling resistance, and is excellent in moldability of the rubber composition to the molded bale and cuttability in measuring the molded bale. The vinyl aromatic monomer block content is preferably 7% by mass or less, more preferably 5% by mass or less, and further preferably 3% by mass or less.

From the viewpoint of flexibility of the rubber-like polymer and the rubber composition, the number of vinyl aromatic monomer blocks each containing a chain of 30 or more vinyl aromatic monomer units is preferably small or zero.

The vinyl aromatic monomer block content can be specifically measured, for example, when a polymer contained in the rubber-like polymer (A) is a butadiene-styrene copolymer, by decomposing the polymer by Kolthoff method (method described in I. M. KOLTHOFF, et al., J. Polym. Sci. 1, 429 (1946)) to analyze an amount of polystyrene insoluble in methanol. As another method, a known method, as described in International Publication No. WO2014/133097, such as measurement of a chain of styrene units by NMR can be employed for the measurement.

The vinyl aromatic monomer block content of the rubber-like polymer (A) can be controlled to fall in the above-described numerical range by a method for adding a vinyl aromatic monomer, or by adjusting addition of a polymerization aid, a polymerization temperature and the like.

<Monomer Unit for Causing Unsaturated Group to be Contained in Rubber-like Polymer (A)>

The rubber-like polymer (A) preferably contains a monomer unit having an unsaturated group, such as a conjugated diene monomer unit or a myrcene, in a content of 2% by mass or more. From the viewpoints of economic efficiency and productivity, it is more preferable to contain a conjugated diene monomer unit.

A conjugated diene monomer unit or a myrcene contained as a component of the rubber-like polymer (A) has a double bond, and hence becomes a crosslinkable unsaturated group.

The content of the monomer unit having an unsaturated group, such as a conjugated diene monomer unit or a myrcene, in the rubber-like polymer (A) is closely related to the iodine value described above.

When the content of the monomer unit having an unsaturated group, such as a conjugated diene monomer unit or a myrcene, is 2% by mass or more, the resultant is excellent in ease of crosslinking and adhesiveness of a packaging sheet to the molded bale of the rubber composition. The content of a conjugated diene monomer unit is more preferably 3% by mass or more, and further preferably 6% by mass or more.

The content of the monomer unit having an unsaturated group, such as a conjugated diene monomer unit or a myrcene, is preferably 50% by mass or less, more preferably 30% by mass or less, and further preferably 20% by mass or less. In such a case, mechanical strength and abrasion resistance obtained in the form of a tire are excellent.

The content of the monomer unit having an unsaturated group, such as a conjugated diene monomer unit or a myrcene, in the rubber-like polymer (A) can be measured by a method described in the Examples below, and can be controlled to fall in the above-described numerical range by adjusting a hydrogenation rate described below.

(Aluminum (B))

In the rubber composition of the present embodiment, the content of the aluminum (B) is less than 2 ppm. When the content falls in this range, an effect of suppressing an increase in the viscosity of the rubber composition of the present embodiment over time is exhibited.

The increase in the viscosity of the rubber composition of the present embodiment over time can be suppressed by setting the concentration of the aluminum (B) to be low probably for the following reason: When aluminum is contained in the rubber composition in a content of 2 ppm or more, a compound containing the aluminum dispersed in a micronized form is interacted with a heteroatom of the rubber-like polymer or a residue of a coupling agent to increase the viscosity. Therefore, when the content of aluminum is less than 2 ppm, such viscosity increase can be suppressed.

When a weight average molecular weight of the rubber-like polymer (A) described later is 310,000 or more, when the rubber-like polymer (A) contains a nitrogen atom and the nitrogen atom is easily converted to primary amine, or when the rubber-like polymer (A) further contains a coupling agent containing alkoxysilane, the effect of suppressing the increase over time of the viscosity exhibited by the aluminum content less than 2 ppm is remarkable.

The content of the aluminum (B) is defined as an amount of the element even when it is contained as a compound containing aluminum.

The content of aluminum in the rubber-like polymer (A) can be measured by a method described in the Examples below, and can be controlled to fall in the above-described numerical range by adjusting the type and an amount of a polymerization catalyst or a hydrogenation catalyst added, and conditions for decalcification process or process for removing a solvent described below.

(Titanium (C))

The content of the titanium (C) in the rubber composition of the present embodiment is 3 ppm or more and 120 ppm or less (3 ppm content of titanium (C) 120 ppm).

From the viewpoint of mold contamination resistance of a mold in molding the rubber composition, the content is preferably 3 ppm or more, more preferably 10 ppm or more, and further preferably 15 ppm or more.

On the other hand, from the viewpoints of suppression of peeling the rubber composition off from the molded bale, suppression of causing mesh clogging otherwise caused by a gel component generated when the viscosity of the rubber composition is increased over time, and adhesiveness of a packaging sheet to the molded bale, the content is 120 ppm or less, more preferably 100 ppm or less, further preferably 50 ppm or less, and still further preferably 30 ppm or less.

The mold contamination can be suppressed by the presence of the titanium (C) probably because close contact of a polymer with a mold is reduced due to the presence of metal particles on a surface in contact with the mold like an effect of a baby powder.

The content of the titanium (C) can be controlled to fall in the above-described numerical range by adjusting an amount of a hydrogenation catalyst containing titanium described below, process for removing a solvent from a polymer solution, or the like.

(Suitable Structure of Rubber-Like Polymer (A))

<Hydrogenated Polymer>

The rubber-like polymer (A) is preferably a hydrogenated polymer obtained by hydrogenating some or most of double bonds of a rubber-like polymer obtained by polymerizing or copolymerizing at least a conjugated diene monomer unit, or a monomer unit having an unsaturated group such as a myrcene.

An unsaturated group contained in the rubber-like polymer (A) encompasses an unsaturated group derived from a conjugated diene monomer unit or a monomer such as a myrcene. In other words, in the production process of the rubber-like polymer (A), in hydrogenating some or most of double bonds contained in a polymer after polymerizing or copolymerizing at least a conjugated diene monomer unit or a monomer unit having an unsaturated group such as a myrcene, it is preferable to contain a conjugated diene monomer unit left not hydrogenated for obtaining a desired iodine value among conjugated diene monomer units.

<Monomer Contained in Rubber-like Polymer (A)>

The rubber-like polymer (A) can be formed from a conjugated diene monomer, and an additional monomer if necessary.

Examples of the conjugated diene monomer include, but are not limited to, 1,3-butadiene, isoprene, 2,3-dimethyl-1, 3-butadiene, 1,3-pentadiene, 3-methyl-1,3-pentadiene, 1,3-hexadiene, and 1,3-heptadiene. Among these, from the viewpoint of industrial availability, 1,3-butadiene and isoprene are preferred, and 1,3-butadiene is more preferred. One of these may be singly used, or two or more of these may be used together.

The additional monomer used if necessary is not especially limited, and from the viewpoint of mechanical strength obtained in the form of a tire, it is preferable to copolymerize a vinyl aromatic monomer. Examples of the vinyl aromatic monomer include, but are not limited to, styrene, p-methylstyrene, α-methylstyrene, vinyl ethyl benzene, vinyl xylene, vinyl naphthalene, diphenylethylene, vinyl benzyl dimethylamine, (4-vinylbenzyl)dimethyl aminoethyl ether, N,N-dimethylaminoethyl styrene, N,N-dimethylaminomethyl styrene, and tertiary amino group-containing diphenylethylene (such as 1-(4-N,N-dimethylaminophenyl)-1-phenylethylene). Among these, from the viewpoint of industrial availability, styrene is preferred.

One of these may be singly used, or two or more of these may be used together.

As the additional monomer used if necessary, the following monomers can be used.

Examples of the additional monomer include unsaturated carboxylic acid ester, unsaturated carboxylic acid, an α,β-unsaturated nitrile compound, α-olefin (such as propylene, butylene, pentene, or hexene), ethylene, myrcene, ethylidene norbornene, isopropylidene norbornene, cyclopentadiene, and divinylbenzene.

<Vinyl Bond Content in Rubber-Like Polymer (A)>

In the rubber-like polymer (A), a vinyl bond content in a conjugated diene monomer unit of a conjugated diene-based polymer before hydrogenation is significant, and the vinyl bond content in a conjugated diene monomer unit is preferably 10% by mol or more, and more preferably 20% by mol or more from the viewpoints of productivity of the rubber-like polymer (A) and high wet skid resistance obtained in the form of a tire. From the viewpoint of mechanical strength obtained in use in a tire, the vinyl bond content is preferably 70% by mol or less, more preferably 60% by mol or less, further preferably 45% by mol or less, and still further preferably 30% by mol or less.

The vinyl bond content can be measured by a method described in the Examples below.

The vinyl bond content can be controlled to fall in the above-described numerical range by adjusting a polymerization temperature and an amount of a polar compound added in polymerization.

<Polymerization and Hydrogenation Process of Rubber-like Polymer (A)>

The polymerization process and the hydrogenation process for producing the rubber-like polymer (A) can be each performed by a batch method or a continuous method.

Intermolecular and intramolecular distributions in the rubber-like polymer (A) of the hydrogenation rate, the ethylene, and the monomers such as the conjugated diene monomer and the vinyl aromatic monomer are not especially limited but these may be uniformly present, non-uniformly present, or present with a distribution.

<Content of Vinyl Aromatic Monomer Unit>

A content of the vinyl aromatic monomer unit in the rubber-like polymer (A) is preferably 5% by mass or more, more preferably 10% by mass or more, further preferably 15% by mass or more, and still further preferably 20% by mass or more from the viewpoints of resistance to deformation of a molded article during transport, and break strength and wet skid resistance obtained when the composition is used in a tire tread.

On the other hand, from the viewpoint of cuttability in measuring the molded bale, and fuel economy and abrasion resistance when the composition is used in a tire tread, the content is preferably 45% by mass or less, more preferably 30% by mass or less, and further preferably 25% by mass or less.

Besides, if a high modulus is required as in a run flat tire member or the like, the content is preferably 30% by mass or more.

The content of the vinyl aromatic monomer unit in the rubber-like polymer (A) can be measured by a method described in the Examples below, and can be controlled to fall in the above-described numerical range by adjusting the amount of the vinyl aromatic monomer added in the polymerization process.

<Nitrogen Atom>

The rubber-like polymer (A) preferably contains a nitrogen atom from the viewpoints of peeling resistance of the rubber composition from the molded article of the rubber composition and fuel economy in the form of a tire.

A nitrogen atom can be contained in the rubber-like polymer (A) by using, in the production process of the rubber-like polymer (A), for example, a coupling agent containing a nitrogen atom.

<Modification Ratio>

The rubber-like polymer (A) has a modification ratio, measured by column adsorption GPC of the rubber-like polymer (A), of preferably 40% by mass or more, more preferably 60% by mass or more, and further preferably 70% by mass or more from the viewpoint of dispersibility of silica obtained in producing a tire using silica.

Herein, the term "modification ratio" refers to a mass ratio of a polymer having a nitrogen atom-containing functional group to the total amount of the rubber-like polymer (A).

A position where a nitrogen atom is introduced in the rubber-like polymer (A) may be any one of a polymerization starting end, a molecular chain (including a graft product), and a polymerization end of the rubber-like polymer (A).

In the rubber-like polymer (A), from the viewpoints of polymerization productivity, a high modification ratio, and abrasion resistance and fuel economy in the form of a tire, it is preferable that a tin atom or a nitrogen atom be introduced into the rubber-like polymer (A) with a coupling agent containing a tin atom or a nitrogen atom. It is more preferable that a nitrogen atom be introduced into the rubber-like polymer (A) with a coupling agent containing a nitrogen atom.

As a coupling agent containing a nitrogen atom, from the viewpoints of polymerization productivity and a high modification ratio, an isocyanate compound, an isothiocyanate compound, an isocyanuric acid derivative, a nitrogen group-containing carbonyl compound, a nitrogen group-containing vinyl compound, a nitrogen group-containing epoxy compound, a nitrogen group-containing alkoxysilane compound and the like are preferred.

Among these coupling agents containing a nitrogen atom, from the viewpoints of polymerization productivity of the rubber-like polymer (A), a high modification ratio, and tensile strength obtained in the form of a tire, a nitrogen group-containing alkoxysilane compound is more preferred.

Examples of the nitrogen group-containing alkoxysilane compound include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, 2-ethoxy-2-ethyl-1-(3-diethoxyethylsilylpropyl)-1-aza-2-silacyclopentane, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, tris(4-trimethoxysilylbutyl)amine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

(Physical Properties of Rubber-like Polymer (A) and Rubber Composition)

<Glass Transition Temperature>

A glass transition temperature of the rubber-like polymer (A) is preferably −90° C. or more, more preferably −80° C. or more, and further preferably −75° C. or more from the viewpoint of tensile strength obtained in the form of a tire.

On the other hand, from the viewpoints of cut resistance of a sheet obtained in producing a tire and flexibility obtained in the form of a tire, the glass transition temperature is preferably −15° C. or less, more preferably −30° C. or less, and further preferably −40° C. or less.

With respect to the glass transition temperature, a peak top (an inflection point) of a DSC differential curve obtained by recording a DSC curve during temperature increase in a prescribed temperature range in accordance with ISO 22768:2006 is defined as the glass transition temperature.

<Weight Average Molecular Weight>

A weight average molecular weight of the rubber-like polymer (A) is preferably 150,000 or more, more preferably 200,000 or more, further preferably 310,000 or more, and still further preferably 350,000 or more from the viewpoints of shape stability of a molded article obtained using the rubber composition of the present embodiment, and tensile strength, abrasion resistance and crack resistance of a crosslinked product obtained using the rubber composition.

On the other hand, from the viewpoint of processability in forming the rubber composition of the present embodiment as a crosslinking rubber composition, the weight average molecular weight is preferably 1,000,000 or less, more preferably 500,000 or less, and further preferably 400,000 or less.

From the viewpoint of fuel economy when the rubber composition is used in a tire, a molecular weight distribution (=weight average molecular weight/number average molecular weight) of the rubber-like polymer (A) is preferably 2.0 or less, more preferably 1.8 or less, and further preferably 1.6 or less.

On the other hand, from the viewpoint of processability when the rubber composition is formed as a crosslinking composition, the molecular weight distribution is preferably 1.05 or more, more preferably 1.2 or more, and further preferably 1.4 or more.

The weight average molecular weight and the molecular weight distribution can be calculated based on a molecular weight in terms of polystyrene measured by GPC (gel permeation chromatography), and can be measured by a method described in the Examples below.

<Mooney Viscosity>

Mooney viscosities of the rubber-like polymer (A) and the rubber composition of the present embodiment can be indexes including information of the rubber-like polymer (A), such as the molecular weight, the molecular weight distribution, a branch number, and a content of a softener.

The Mooney viscosity measured at 100° C. of the rubber composition of the present embodiment is preferably 40 or more, more preferably 50 or more, and further preferably 55 or more from the viewpoints of abrasion resistance, steering stability and break strength obtained when the crosslinking rubber composition is used in a tire.

On the other hand, from the viewpoints of productivity of the rubber-like polymer (A) and the rubber composition of the present embodiment, and processability in producing a composition with a filler and the like blended, the Mooney viscosity is preferably 170 or less, more preferably 150 or less, further preferably 130 or less, and still further preferably 110 or less.

As a measurement method for the Mooney viscosity, a method prescribed in ISO 289 can be applied.

(Rubber Softener (D))

The rubber composition of the present embodiment may contain a rubber softener (D) if necessary. A content of the rubber softener (D) is preferably 30% by mass or less.

For improving productivity of the rubber-like polymer (A) and processability when blending an inorganic filler and the like in producing a tire, the content of the rubber softener (D) in the rubber composition of the present embodiment is preferably 1 to 30% by mass.

If the rubber-like polymer (A) has a high molecular weight, for example, if the weight average molecular weight exceeds 1,000,000, the content of the rubber softener (D) is preferably 15 to 30% by mass. On the other hand, if the rubber composition contains a filler blended therein, the content of the rubber softener (D) is preferably 1 to 15% by mass from the viewpoint of increasing the degree of blending freedom.

The content of the rubber softener (D) in the rubber composition of the present embodiment is more preferably 20% by mass or less, further preferably 10% by mass or less, and still further preferably 5% by mass or less from the viewpoint of suppressing degradation over time caused when the composition is used in a tire, and from the viewpoint of mold contamination resistance.

The rubber softener (D) is not especially limited, and examples include an extender oil, a liquid rubber, and a resin.

From the viewpoints of processability, productivity, and economic efficiency, the rubber softener (D) is preferably an extender oil.

As a method for adding the rubber softener (D) to the rubber composition of the present embodiment, although not limited to the following, a method in which the rubber softener is added to be mixed with a polymer solution, and the thus obtained polymer solution containing the rubber softener is desolvated is preferably employed.

Preferable examples of the extender oil include, but are not limited to, an aromatic oil, a naphthenic oil, and a paraffin oil.

Among these, from the viewpoint of environmental safety, and from the viewpoints of oil bleed prevention and wet grip characteristics, an aroma substitute oil containing 3% by mass or less of a polycyclic aromatic (PCA) component in accordance with the IP 346 method is preferred. Examples of the aroma substitute oil include TDAE (Treated Distillate Aromatic Extracts) and MES (Mild Extraction Solvate) described in Kautschuk Gummi Kunststoffe 52 (12) 799 (1999), and RAE (Residual Aromatic Extracts).

[Method for Producing Molded Bale of Rubber Composition]

A method for producing a molded bale of a rubber composition of the present embodiment comprises the steps of: polymerizing at least a conjugated diene monomer in a solution to obtain a rubber-like polymer (A); adding titanium (C) to the resultant solution containing the rubber-like polymer (A) to obtain a rubber composition; and molding the resultant rubber composition.

In a preferable aspect, the polymerization step is a step of polymerizing conjugated diene and/or a step of copolymerizing conjugated diene and aromatic vinyl, and a compound containing the titanium (C) functions as a hydrogenation catalyst in a solution containing a (co)polymer to generate the rubber-like polymer (A).

(Polymerization Method and Hydrogenation Method for Rubber-Like Polymer (A))

From the viewpoints of production cost of the rubber-like polymer (A), and fuel economy and flexibility when used in a tire, the rubber-like polymer (A) is obtained by polymerizing at least a conjugated diene monomer, or copolymerizing the conjugated diene monomer and another monomer.

It is preferable to hydrogenate some or most of double bonds contained in the rubber-like polymer (A).

As an unsaturated group in the rubber-like polymer (A), it is preferable to contain a conjugated diene monomer unit left not hydrogenated for obtaining a desired iodine value among conjugated diene monomer units.

As a method for polymerizing or copolymerizing at least a conjugated diene monomer and then hydrogenating the resultant, for example, as described in International Publication No. WO96/005250, Japanese Patent Laid-Open No. 2000-053706, and International Publication Nos. WO2003/085010, WO2019/151126, WO2019/151127, WO2002/002663, and WO2015/006179, a method in which a conjugated diene monomer is polymerized by anionic polymerization, or copolymerized with an additional monomer if necessary, with various additives under various conditions, and then hydrogenating the resultant is preferably employed.

(Titanium (C) in Rubber Composition)

The titanium (C) contained in the rubber composition of the present embodiment is preferably a residue of a catalyst used in the production of the rubber-like polymer (A).

In such a case, the titanium (C) used as the catalyst is preferably a hydrogenation catalyst component.

As the hydrogenation catalyst component used in the production of the rubber-like polymer (A), from the viewpoint that an amount of metal in the rubber composition of the present embodiment can be easily adjusted to a desired amount, Ti compounds described in, for example, Japanese Patent Laid-Open Nos. 1-275605, 2-172537, 4-96904, 08-33846, and 08-41081, and International Publication Nos. WO2014/046016, WO2014/046017, WO2014/065283, and WO2017/090714 are preferably used.

The hydrogenation catalyst component is preferably a mixture or a reaction product of a Ti compound with a Li compound and/or a Mg compound. From the viewpoint of a hydrogenation speed, a mixture or a reaction product of a Ti compound with a Li compound is further preferred.

An example of the Ti compound includes titanocene represented by the following formula (1):

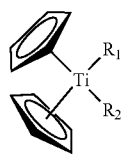

(1)

wherein $R_1$ and $R_2$ represent a group selected from the group consisting of a hydrocarbon group having 1 to 12 carbon atoms, an aryloxy group, an alkoxy group, a halogen group, and a carbonyl group, and $R_1$ and $R_2$ may be the same or different.

From the viewpoint of a high hydrogenation speed, preferable examples of the Ti compound include, but are not limited to, bis($\eta$5-cyclopentadienyl)titanium di(p-tolyl), bis($\eta$5-cyclopentadienyl)titanium di(phenyl), bis($\eta$5-cyclopentadienyl)titanium di(3,4-xylyl), bis($\eta$5-cyclopentadienyl)titanium (furfuryloxy)chloride, and bis($\eta$5-cyclopentadienyl) titanium dichloride.

From the viewpoint of economic efficiency, bis(15-cyclopentadienyl)titanium dichloride is more preferred.

Examples of the Li compound include, but are not limited to, methyllithium, ethyllithium, n-propyllithium, isopropyllithium, n-butyllithium, sec-butyllithium, isobutyllithium, t-butyllithium, n-pentyllithium, n-hexyllithium, phenyllithium, cyclopentadienyllithium, m-tolyllithium, p-tolyllithium, xylyllithium, dimethylaminolithium, diethylaminolithium, methoxylithium, ethoxylithium, n-propoxylithium, isopropoxylithium, n-butoxylithium, sec-butoxylithium, t-butoxylithium, pentyloxylithium, hexyloxylithium, heptyloxylithium, octyloxylithium, phenoxylithium, 4-methylphenoxylithium, benzyloxylithium, and 4-methylbenzyloxylithium.

Examples of the Mg compound include, but are not limited to, dimethylmagnesium, diethylmagnesium, dibutylmagnesium, ethylbutylmagnesium, methylmagnesium bromide, methylmagnesium chloride, ethylmagnesium bromide, ethylmagnesium chloride, phenylmagnesium bromide, phenylmagnesium chloride, t-butylmagnesium chloride, and t-butylmagnesium bromide.

(Amounts of Titanium and Aluminum used in Polymer Production Process)

An amount of the titanium (C) to be added as the hydrogenation catalyst component in the production of the rubber-like polymer (A) is preferably 150 ppm or less based on a polymer before hydrogenation. When the amount falls in this range, the content of the titanium (C) contained in the rubber composition of the present embodiment can be easily controlled to the range of 3 ppm or more and 200 ppm or less.

An amount of the aluminum (B) to be added in the production of the rubber-like polymer (A) is preferably 6 ppm or less. When the amount falls in this range, the content of the aluminum (B) contained in the rubber composition of the present embodiment can be easily controlled to less than 2 ppm. It is more preferable, from the viewpoint of reducing a residue of the aluminum (B) in the rubber composition of the present embodiment, that aluminum is not substantially added. Besides, when lithium or magnesium is used instead of aluminum, the function of the aluminum as a promoter can be complemented.

From the viewpoints of suppressing increase of a Mooney viscosity (ML viscosity), and handleability and safety of the hydrogenation catalyst, the hydrogenation catalyst to be added in the production of the rubber-like polymer (A) contains, per mol of the titanium (C), the aluminum (B) preferably in a content of 0.05 mol or less, more preferably in a content of 0.04 mol or less, further preferably in a content of 0.03 mol or less, and still further preferably contains no aluminum (B).

(Amount of Metal excluding Al and Ti in Rubber Composition)

As a metal different from the aluminum (B) and the titanium (C), a content of lithium in the rubber composition of the present embodiment is preferably 60 ppm or less, more preferably 50 ppm or less, further preferably 40 ppm or less, and still further preferably 30 ppm or less from the viewpoint of discoloration resistance of the rubber composition of the present embodiment. On the other hand, from the viewpoint of tensile elongation obtained by crosslinking, the content is preferably 2 ppm or more, more preferably 5 ppm or more, and further preferably 10 ppm or more.

The contents of the titanium (C) and lithium described above are defined as amounts of the respective elements even if these are contained in the form of compounds.

When the titanium (C) contained in the rubber composition of the present embodiment is a residue of the hydrogenation catalyst component or the polymerization catalyst component, the titanium (C) is finely dispersed in the rubber composition, and changed to a compound or a complex difficult to be specified, and there is a possibility that physical properties of the rubber composition may be largely affected. Therefore, the titanium (C) is preferably dispersed in the form of a particle in the rubber composition of the present embodiment from the viewpoints of not affecting the physical properties of the rubber composition and not making it difficult to be specified, and of reducing close contact of the rubber composition to a mold.

(Addition of Additives)

In the production of the rubber composition of the present embodiment, from the viewpoint that an amount of metal in the rubber composition of the present embodiment can be easily adjusted to a prescribed amount, a deactivator, a neutralizer or the liker is preferably added after the polymerization step for the rubber-like polymer (A).

Examples of the deactivating agent include, but are not limited to, water; and alcohols such as methanol, ethanol, and isopropanol.

Examples of the neutralizer include, but are not limited to, carboxylic acids such as stearic acid, oleic acid, and versatic acid (a carboxylic acid mixture having 9 to 11 carbon atoms, mainly 10 carbon atoms, and having many branches); an aqueous solution of an inorganic acid, and carbon dioxide gas.

After the polymerization process of the rubber-like polymer (A), a rubber stabilizer is preferably added from the viewpoints of prevention of gel formation and processing stability.

As the rubber stabilizer, any of known stabilizers, not limited to the following, can be used, and antioxidants such as 2,6-di-tert-butyl-4-hydroxytoluene (hereinafter sometimes referred to as "BHT"), n-octadecyl-3-(4'-hydroxy-3', 5'-di-tert-butylphenol)propionate, and 2-methyl-4,6-bis[(octylthio)methyl]phenol are preferred.

To the rubber composition of the present embodiment, various additives can be further added if necessary. As such additives, a filler described below, or a resin component or the like used as a tackifier can be added as a master batch in process performed before molding. In this case, the amount of the additive is preferably 15% by mass or less.

In the rubber composition of the present embodiment, from the viewpoint of improving balance among handleability and mechanical strength of the rubber composition, and fuel economy and abrasion resistance when used in a tire, a total content of the rubber-like polymer (A), the aluminum (B), the titanium (C), and the rubber softener (D) is preferably 85% by mass or more, more preferably 95% by mass or more, and further preferably 97% by mass or more.

In producing the rubber composition of the present embodiment, the step of polymerizing the rubber-like polymer (A) in a solution is performed, and then, the solvent is removed from the polymer solution.

An example of a method for removing the solvent from the polymer solution includes a method using flushing, steam stripping, a drying conveyer after dehydrogenation, a devolatilizing extruder, a drum dryer, or a devolatilizing kneader.

From the viewpoints that thermal history is small and that the amount of metal in the rubber composition can be easily adjusted to a desired amount, a method using at least steam stripping is preferred. In particular, a rubber-like polymer (A) using a coupling agent containing a nitrogen atom is difficult to adjust the amount of metal therein, and hence, the method using steam stripping is useful from the viewpoint of adjustment of the amount of metal.

Examples of a steam stripping method and a method of a treatment performed before or after include, but are not limited to, methods described in Japanese Patent Laid-Open Nos. 10-168101 and 10-204136, International Publication No. WO2013/146530, Japanese Patent Laid-Open No. 2019-131810 and the like.

In the method for producing a rubber composition of the present embodiment, at a previous stage of performing an extruding/drying step, a step of desolvating a solvent from the polymer solution by steam stripping, and a screening step of taking out, from a slurry of the polymer, a water-containing crumb by separating from stripping water are preferably performed.

In a previous stage of the steam stripping, a flushing step may be performed for increasing the concentration of the solution.

When the desolvating step of removing the solvent from the polymer solution by steam stripping is performed at a previous stage of the extruding/drying step, a slurry in which porous granular crumbs not containing the solvent but containing water are dispersed in hot water is obtained.

When the screening step of taking out, from the slurry of the polymer, the water-containing crumb by separating from stripping water is performed, a porous granular crumb containing water can be obtained. Besides, a squeezing dehydration step for performing dehydration with a roll, a screw compression squeezer or the like is preferably performed if necessary. Through such a dehydration step, a water-containing crumb in which the water content has been reduced can be obtained at the previous stage of the extruding/drying step.

As a method for controlling, by steam stripping, the content of the titanium (C) in the rubber composition of the present embodiment to 3 ppm or more and 120 ppm or less, the solution of the rubber-like polymer (A) after polymerization is contacted with hot water or steam under conditions adjusted by employing, as a useful method, a method in which a pressure for charging the solution is adjusted, a method in which a pressure, a temperature and an amount of steam are adjusted, a method in which a dispersant such as a phosphoric acid ester or a salt thereof like polyoxyalkylene alkyl ether phosphate, or a surfactant such as nonyl phenoxy polyethylene glycol phosphate or a salt thereof is added to steam, or a method in which the shape or the rotation speed of a rotor used in mixing are adjusted.

In the production of the rubber composition of the present embodiment, for economic efficiency and removability of metal, it is preferable to contain an alcohol compound in the polymer solution as a deactivating agent, and it is more preferable to precedently add a dispersant or a surfactant to be added in steam stripping.

As a method for reducing the content of the titanium (C) in the rubber composition of the present embodiment, a method in which an alcohol compound is added, as a deactivating agent, to the polymer solution after polymerization of the rubber-like polymer (A) in an amount of 0.5 fold mol or more, and preferably 1.0 fold mol or more of the number of moles of the rubber-like polymer (A), a method in which a volume ratio of steam/polymer solution is set to 0.1 or more, and preferably 0.2 or more in steam stripping process, a method in which a processing rate is reduced, or a method in which a surfactant is added to the polymer solution in an amount of 100 ppm or more, and preferably 200 ppm or more based on the polymer can be employed.

In the steam stripping process, a linear velocity of the rotor is preferably 5 m/s or more and 20 m/s or less, and more preferably 10 m/s or more and 20 m/s or less.

After the steam stripping, as described in International Publication No. WO2013/146530, a method for subjecting the resultant rubber composition to drying by extrusion and drying with hot air is preferably performed.

In this manner, a porous granular crumb can be obtained.

With respect to a size of particles of a metal or a metal compound contained in the rubber composition, from the viewpoints of property balance among suppression of mold contamination, peeling resistance of the rubber composition from the molded bale, and smoothness when a crosslinking rubber composition is formed into a sheet, 60% by volume or more of a total amount, 100% by volume, of the particles of the metal or the metal compound preferably have a particle size of 0.1 to 90 μm, and it is more preferable that 80% by volume or more of the particles have a particle size falling in this range of the particle size.

The particle size of the metal or the metal compound contained in the rubber composition can be measured by analyzing, with a laser diffraction type particle size distribution analyzer, a polymer solution obtained by dissolving the rubber composition containing the metal or the metal compound in an inert solvent.

A particle size of the crumb is preferably 0.1 mm or more, and more preferably 0.5 mm or more from the viewpoint of obtaining release resistance of the rubber composition from the molded article, and from the viewpoint of scattering resistance in drying.

On the other hand, the particle size of the crumb is preferably 30 mm or less, and more preferably 20 mm or less from the viewpoints of a drying property of the solvent remaining in the crumb and the water, and swelling resistance of a molded article obtained by molding the rubber composition.

As a method for adjusting the particle size of the crumb, the particle size may be adjusted during process where the solvent is removed and the crumb is dried, or may be adjusted by processing the produced crumb.

When the particle size is adjusted during process where the solvent is removed and the crumb is dried, a method to be employed is not especially limited, and for example, a method in which the molecular weight, the composition or the structure of the rubber-like polymer (A) is adjusted, a method in which the amount of the rubber softener (D) to be added to the solution of the rubber-like polymer (A) is adjusted, a method in which a hole size of a die of an extrusion dryer is adjusted, or a method in which conditions for desolvation performed with the solution of the rubber-like polymer (A) put in hot water are adjusted can be employed.

When the particle size is adjusted by processing the produced crumb, a method to be employed is not especially limited, and for example, a method in which the crumb is sieved, or a method in which the crumb is ground and crushed with a mixer or a granulator can be employed.

A specific surface area of the crumb of the rubber composition of the present embodiment is preferably 0.7 to 3.2 $m^2/g$, and more preferably 1.0 to 3.0 $m^2/g$ from the viewpoint of handleability.

When the specific surface area of the crumb is 0.7 $m^2/g$ or more, an area where one crumb is in close contact with other crumbs present around a molded article, in molding, is increased, and hence the crumb is difficult to peel off from the molded article. When the specific surface area of the crumb is 3.2 $m^2/g$ or less, crumb particles are compressed at a high density to reduce gaps among the crumbs, and hence expansion of the molded article can be suppressed.

A method for adjusting the specific surface area of the crumb to fall in the above-described range is not especially limited, and for example, a method in which the crumbs are sieved to adjust the composition of each group of sieved crumbs can be employed.

The amount of the solvent remaining in the rubber composition of the present embodiment is preferably smaller from the viewpoints of an odor and VOC reduction. The amount is preferably 5,000 ppm or less, more preferably 3,000 ppm or less, and further preferably 1,500 ppm or less. From the viewpoint of balance in economic efficiency, the amount is preferably 50 ppm or more, more preferably 150 ppm or more, and further preferably 300 ppm or more.

(Water Content of Rubber Composition of Molded Bale)

A water content of the rubber composition of the molded bale of the present embodiment is preferably 0.05% by mass or more and 1.5% by mass or less.

The water content of the rubber composition is preferably 0.05% by mass or more, more preferably 0.1% by mass or more, and further preferably 0.2% by mass or more from the viewpoints of inhibiting gelation otherwise caused in drying after solvent removal, and inhibiting yield reduction otherwise caused by powder generation. On the other hand, from the viewpoint of preventing condensation of the rubber composition, the water content is preferably 1.5% by mass or less, more preferably 1.0% by mass or less, and further preferably 0.8% by mass or less.

The water content of the rubber composition of the molded bale of the present embodiment can be controlled to fall in the above-described numerical range by adjusting the shape of the crumb, and the conditions for drying process.

[Molded Article]

The molded bale of the present embodiment is preferably a molded article of the rubber composition of the present embodiment described above, and is a molded article in the shape of a block from the viewpoint of handleability.

The molded bale of the present embodiment is further preferably a molded article in the shape of a block (bale) of 1,000 $cm^3$ or more. The molded bale is still further preferably a rectangular parallelepiped molded bale of 17.5 kg to 35 kg.

The molded bale of the present embodiment can be molded by a method in which a crumb is compressed, or a method in which sheets are produced and stacked to be compressed, and a preferable molding method is a method in which crumbs having a specific surface area of 0.7 $m^2/g$ to 3.2 $m^2/g$ are produced, and the resultant crumbs are compression molded. From the viewpoint of moldability, it is preferable to further perform a step of sieving the crumbs before molding.

Since the crumbs are in close contact with one another in the compression molding of the crumbs, a specific surface area of the molded article is small as compared with the specific surface area of the crumbs. The close contact among the crumbs in the compression molding can be adjusted in accordance with the molecular weight, the composition and the structure of the rubber-like polymer (A), the composition of the rubber softener, and a temperature and a pressure employed in the compression. For example, if the specific surface area of the bale is to be reduced by increasing the close contact among the crumbs, it is preferable to employ a condition of reducing the molecular weight of the rubber-like polymer (A), increasing the amount of the rubber softener, or increasing the temperature and the pressure in the compression.

The specific surface area of the molded bale of the present embodiment is preferably 0.005 to 0.05 m$^2$/g, and more preferably 0.01 to 0.04 m$^2$/g from the viewpoint of a film packaging property. The specific surface area of the molded bale is preferably 0.005 m$^2$/g or more because expansion of the bale can be thus suppressed, and the specific surface area of the molded bale is preferably 0.05 m$^2$/g or less because the crumbs peeling off from the molded bale can be thus reduced.

The specific surface area of the molded bale can be obtained by a BET method.

In general, the specific surface area of a big molded bale tends to be varied depending on the position, and hence, the specific surface area is preferably obtained in a portion near the center of the molded bale.

The crumbs of the rubber composition of the present embodiment are preferably sieved into respective particle sizes, before being molded into the molded bale, to be mixed in an appropriate quantitative ratio.

If the specific surface area of the molded bale molded by directly using the crumbs resulting from the desolvation is over the upper limit of the above-described range, it is preferable to increase, among the sieved crumbs, a composition of crumbs having a large particle size and to reduce a composition of crumbs having a small particle size. If the specific surface area is smaller than the lower limit, it is preferable to reduce the composition of crumbs having a large particle size and to increase the composition of crumbs having a small particle size.

A compression pressure for molding the molded bale of the present embodiment is preferably 3 to 30 MPa, and more preferably 10 to 20 MPa. When the compression pressure in the molding is 30 MPa or less, an apparatus to be used can be designed to be compact, and hence installation efficiency is high. When the compression pressure in the molding is 3 MPa or more, good moldability is obtained. When good moldability is obtained, there is a tendency that the surface of the resultant molded bale is smooth, that the polymer is not peeled off after the molding step, and that expansion otherwise caused after the molding is suppressed.

A temperature of the rubber composition in the molding is preferably 30 to 120° C., and from the viewpoints of reducing a residual solvent and inhibiting thermal deterioration, is more preferably 50 to 100° C.

The temperature of the rubber composition in the molding is preferably 30° C. or more because good moldability is thus obtained, and on the other hand, the temperature is preferably 120° C. or less because gel formation otherwise caused by thermal deterioration of the rubber composition can be thus inhibited.

As the temperature and the pressure in the molding of the bale are higher, a specific surface area of the resultant molded bale is smaller.

A pressure holding time in the molding is preferably 3 to 30 seconds, and more preferably 5 to 20 seconds. When the pressure holding time in the compression is 30 seconds or less, good production efficiency is obtained, and when it is 5 seconds or more, good moldability is obtained.

In order to avoid molded bales from coming to close contact with one another, the molded bale of the present embodiment is preferably packaged in a resin film (packaging sheet).

As the resin of the film, for example, polyethylene, an ethylene copolymer resin, polystyrene, high impact polystyrene, or PET can be used.

From the viewpoints of handleability of the molded article during transport, and suppression in occurrence of condensation between the packaging sheet and the molded bale, the packaging sheet preferably has good adhesiveness to the molded bale.

The molded bale of the present embodiment is used, for example, to be contained in a vessel for transport. An expansion rate of the molded bale obtained 1 day after the molding is preferably less than 5% because the molded bale can be thus satisfactorily held in the vessel.

[Crosslinking Rubber Composition]

From the viewpoint of high mechanical strength and the like, the rubber composition contained in the molded bale of the present embodiment is preferably formed into a crosslinking rubber composition by adding a crosslinking agent thereto to obtain a crosslinked product by crosslinking, which can be used in various applications.

The crosslinking rubber composition of the present embodiment contains at least the rubber composition of the present embodiment described above, and a crosslinking agent, and can further contain, if necessary, an additional rubber component, a filler and the like.

The additional rubber component is not especially limited, and can be appropriately selected depending on purposes. Examples include a styrene-butadiene rubber (of emulsion polymerization type or solution polymerization type), a natural rubber, polyisoprene, a butadiene rubber, an acrylonitrile-butadiene rubber (NBR), a chloroprene rubber, an ethylene-propylene rubber (EPM), an ethylene-propylene-non-conjugated diene rubber (EPDM), a butyl rubber, a polysulfide rubber, a silicone rubber, a fluororubber, and a urethane rubber.

One of these may be singly used, or a mixture of two or more of these may be used.

A content of the rubber-like polymer (A) based on a total rubber content corresponding to a total amount of the rubber-like polymer (A) and the additional rubber component in the crosslinking rubber composition of the present embodiment is preferably 20% by mass or more, more preferably 40% by mass or more, further preferably 60% by mass or more, and still further preferably 80% by mass or more from the viewpoint of exhibiting the effects of the present invention.

To the crosslinking rubber composition of the present embodiment, a filler can be added if necessary for purposes of improving a reinforcing property and the like.

An amount of the filler to be blended is not especially limited, can be appropriately selected depending on purposes, and is preferably 10 to 100 parts by mass, and more preferably 20 to 80 parts by mass based on 100 parts by mass of the rubber component corresponding to the total amount of the rubber-like polymer (A) and the additional rubber component.

When the amount of the filler to be blended is 10 parts by mass or more, the effect of improving a reinforcing property resulting from blending the filler can be obtained. When the amount is 100 parts by mass or less, good processability can be retained with avoiding large deterioration of fuel economy caused in the form of a tire.

The filler is not especially limited, and examples include carbon black, silica, aluminum hydroxide, clay, alumina, talc, mica, kaolin, glass balloon, glass bead, calcium carbonate, magnesium carbonate, magnesium hydroxide, magnesium oxide, titanium oxide, potassium titanate, and barium sulfate. Among these, carbon black is preferably used. One of these may be singly used, or two or more of these may be used together.

The carbon black is not especially limited, and can be appropriately selected depending on purposes, and examples include FEF, GPF, SRF, HAF, N339, IISAF, ISAF, and SAF. One of these may be singly used, or two or more of these may be used together.

A nitrogen adsorption specific surface area (N2SA, measured in accordance with JIS K6217-2: 2001) of the carbon black is not especially limited, and can be appropriately selected depending on purposes.

When the crosslinking rubber composition of the present embodiment is used as a composition for a fuel efficient tire tread, precipitated silica is suitably used as the filler.

The crosslinking rubber composition of the present embodiment may contain a silane coupling agent from the viewpoints of improvement of dispersibility of the filler and tensile physical strength of the crosslinked product.

The silane coupling agent is preferably a compound that has a function to make close the interaction between the rubber component and the inorganic filler, has a group having affinity with or a binding property to each of the rubber component and a silica-based inorganic filler, and contains, in one molecule, a sulfur bond portion and an alkoxysilyl group or silanol group portion.

Examples of such a compound include, but are not limited to, bis-[3-(triethoxysilyl)-propyl]-tetrasulfide, bis-[3-(triethoxysilyl)-propyl]-disulfide, bis-[2-(triethoxysilyl)-ethyl]-tetrasulfide, S-[3-(triethoxysilyl)-propyl]octanethioate, a condensate of S-[3-(triethoxysilyl)-propyl]octanethioate and [(triethoxysilyl)-propyl]thiol, and a silane carrying at least one thiol (—SH) functional group (referred to as mercaptosilane) and/or at least one masked thiol group.

A content of the silane coupling agent in the crosslinking rubber composition of the present embodiment is preferably 0.1 parts by mass or more and 30 parts by mass or less, more preferably 0.5 parts by mass or more and 20 parts by mass or less, and further preferably 1.0 part by mass or more and 15 parts by mass or less based on 100 parts by mass of the filler. When the content of the silane coupling agent falls in this range, there is a tendency that the effect attained by the addition of the silane coupling agent can be made further remarkable.

The crosslinking rubber composition of the present embodiment contains the crosslinking agent.

The crosslinking agent is not especially limited, and can be appropriately selected depending on purposes. Examples include a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent. Any of these may be used together.

As a rubber composition for a tire, a sulfur-based crosslinking agent (vulcanizing agent) is more preferred among these, and in particular, sulfur is further preferred.

A content of the crosslinking agent in the crosslinking rubber composition of the present embodiment is 0.1 parts by mass or more and 20 parts by mass or less based on 100 parts by mass of the rubber component. The content of the crosslinking agent is preferably 0.1 parts by mass or more, more preferably 0.5 parts by mass or more, and further preferably 1.5 parts by mass or more based on 100 parts by mass of the rubber component from the viewpoints of high tensile strength and a high crosslinking speed. On the other hand, from the viewpoints of inhibition of uneven crosslinking and high tensile strength, the content is preferably 20 parts by mass or less, more preferably 5 parts by mass or less, and further preferably 3 parts by mass or less.

It is noted that the rubber component contains the rubber-like polymer (A), and the additional rubber component.

In the crosslinking rubber composition of the present embodiment, a vulcanization accelerator may be used in addition to the vulcanizing agent.

Examples of the vulcanization accelerator include guanidine-based, aldehyde-amine-based, aldehyde-ammonia-based, thiazole-based, sulfenamide-based, thiourea-based, thiuram-based, dithiocarbamate-based, and xanthate-based compounds.

In the crosslinking rubber composition of the present embodiment, in addition to the above-described components, various additives such as an additional softener, an additional filler, a heat stabilizer, an antistatic agent, a weathering stabilizer, an anti-aging agent, a colorant, and a lubricant may be used.

As the additional softener, any of known softeners can be used.

Examples of the additional filler include calcium carbonate, magnesium carbonate, aluminum sulfate, and barium sulfate.

As the heat stabilizer, the antistatic agent, the weathering stabilizer, the anti-aging agent, the colorant, and the lubricant, any of known materials can be respectively used.

(Kneading Method for Crosslinking Rubber Composition)

The crosslinking rubber composition of the present embodiment can be produced by mixing the rubber composition of the present embodiment described above, the crosslinking agent, and if necessary, the silica-based inorganic filler, the carbon black and another filler, the silane coupling agent, and various additives such as the rubber softener.

Examples of a mixing method include, but are not limited to, a melt kneading method using a general mixer such as an open roll, a Banbury mixer, a kneader, a single screw extruder, a double screw extruder, or a multi-screw extruder, and a method in which the respective components are dissolved to be mixed, and then a solvent is removed by heating.

Among these, a melt kneading method using a roll, a Banbury mixer, a kneader or an extruder is preferred from the viewpoints of productivity and good kneadability.

Besides, either of a method in which the rubber component, and the other components of the filler, the silane coupling agent and the additives are kneaded all at once, and a method in which these are mixed dividedly plural times can be employed.

[Applications of Rubber Composition and Molded Article]

The rubber composition and the crosslinking rubber composition of the present embodiment are applicable to, for example, tire members, interiors and exteriors of vehicles, anti-vibration rubbers, belts, shoes, foam materials, and various industrial products.

In particular, the rubber composition and the crosslinking rubber composition are suitably used in tire members.

As the tire members, these compositions can be used in, for example, various tires such as a fuel efficient tire, an all-season tire, a high performance tire, a snow tire, and a studless tire; and various portions of a tire such as a tread, a carcass, a sidewall, and a bead portion. In particular, these compositions are excellent, in the form of a vulcanizate, in balance among abrasion resistance, fuel economy, wet skid resistance, and snow performance, and therefore, are suitably used, as the tire member, for a tire tread of a fuel efficient tire, a high performance tire, or a snow tire.

As a method for producing a tire, any of common methods can be employed. For example, members usually used for production of a tire, such as a carcass layer, a belt layer, and a tread layer containing at least one selected from the group consisting of a crosslinking rubber composition before vulcanization and a tire cord, are successively overlayed on a tire forming drum to adhere to one another, and the drum is pulled out to obtain a green tire. Subsequently, the green tire is vulcanized by heating by an ordinary method, and thus, a desired tire (such as a pneumatic tire) can be produced.

EXAMPLES

The present embodiment will now be described in more detail with reference to specific Examples and Comparative Examples, and it is noted that the present embodiment is not limited to the following Examples and Comparative Examples at all.

Various physical properties of the Examples and Comparative Examples were measured by the following methods.

[Physical Properties of Rubber-Like Polymer (A)]

(Weight Average Molecular Weight (Mw) of Rubber-Like Polymer (A) before Hydrogenation)

A chromatogram was measured with a GPC measuring apparatus including a series of three columns using a polystyrene-based gel as a filler, and a weight average molecular weight (Mw) of a rubber-like polymer before hydrogenation was obtained based on a calibration curve obtained using standard polystyrene.

As an eluent, THF (tetrahydrofuran) containing 5 mmol/L triethylamine was used.

As columns, a guard column: trade name "TSKguardcolumn Super H-H" manufactured by Tosoh Corporation, and columns: trade names "TSKgel Super H5000", "TSKgel Super H6000", and "TSKgel Super H7000" manufactured by Tosoh Corporation were used.

Under conditions of an oven temperature of 40° C. and a THF flow rate of 0.6 mL/min, an RI detector (trade name "HLC8020" manufactured by Tosoh Corporation) was used. A measurement solution was prepared by dissolving 10 mg of a measurement sample in 20 mL of THF, and 20 µL of the measurement solution was injected into the GPC measuring apparatus for measurement.

(Polymer Mooney Viscosity of Rubber-Like Polymer (A) Before Hydrogenation)

A rubber-like polymer before hydrogenation was used as a sample to measure a Mooney viscosity with a Mooney viscometer (trade name "VR1132" manufactured by Ueshima Seisakusho Co., Ltd.) using an L rotor in accordance with ISO 289.

A measurement temperature was set to 100° C. First, a sample was preheated for 1 minute at the test temperature, the rotor was rotated at 2 rpm, and torque was measured after 4 minutes to be defined as a Mooney viscosity ($ML_{(1+4)}$).

(Modification Ratio of Rubber-Like Polymer (A))

A modification ratio of the rubber-like polymer (A) was measured by column adsorption GPC as follows. The modification ratio was measured by utilizing a characteristic that a rubber-like polymer modified with a nitrogen atom-containing functional group adsorbs on a column.

A sample solution containing a rubber-like polymer and low molecular weight internal standard polystyrene was measured for an amount of adsorption to a silica-based column based on a difference between a chromatogram measured with a polystyrene-based column and a chromatogram measured with a silica-based column, and thus, a modification ratio was obtained.

Specifically, the measurement was performed as follows.

Preparation of Sample Solution:

A sample solution was prepared by dissolving 10 mg of the rubber-like polymer and 5 mg of standard polystyrene in 20 mL of THF.

GPC Measurement Conditions using Polystyrene-based Column:

THF containing 5 mmol/L of triethylamine was used as an eluent, and 20 µL of the sample solution was injected into an apparatus for measurement. As columns, a guard column: trade name "TSKguardcolumn Super H-H" manufactured by Tosoh Corporation and columns: trade names "TSKgel Super H5000", "TSKgel Super H6000", and "TSKgel Super H7000" manufactured by Tosoh Corporation were used. Under conditions of an oven temperature of 40° C. and a THF flow rate of 0.6 mL/min, an RI detector (trade name "HLC8020" manufactured by Tosoh Corporation) was used for the measurement to obtain a chromatogram.

GPC Measurement Conditions using Silica-based Column:

An apparatus, trade name "HLC-8320GPC" manufactured by Tosoh Corporation was used, THF was used as an eluent, and 50 µL of a sample solution was injected into the apparatus. Under conditions of an oven temperature of 40° C. and a THF flow rate of 0.5 mL/min, an RI detector was used to obtain a chromatogram. As columns, trade names "Zorbax PSM-1000S", "PSM-300S", and "PSM-60S" in series were used, and a column, trade name "DIOL 4.6×12.5 mm 5 micron" was connected as a guard column at a previous stage.

Calculation Method for Modification Ratio:

A modification ratio (%) was obtained in accordance with the following equation assuming that a whole peak area of the chromatogram obtained with the polystyrene-based column is 100, that a peak area of the sample is P1, that a peak area of the standard polystyrene is P2, that a whole peak area of the chromatogram obtained with the silica-based column is 100, that a peak area of the sample is P3, and that a peak area of the standard polystyrene is P4:

Modification ratio (%)=[1−(P2×P3)/(P1×P4)]×100 wherein P1+P2=P3+P4=100.

(Amount of Bound Styrene in Rubber-Like Polymer (A) Before Hydrogenation)

As a sample, 100 mg of a rubber-like polymer before hydrogenation was dissolved and diluted to 100 mL of chloroform to obtain a measurement sample. An amount of absorption by a phenyl group of styrene at an ultraviolet absorption wavelength (about 254 nm) was used to measure an amount of bound styrene (% by mass) based on 100% by mass of the rubber-like polymer before hydrogenation used as the sample.

As a measuring apparatus, a spectrophotometer "UV-2450" manufactured by Shimadzu Corporation was used.

(Microstructure of Butadiene Portion (1,2-Vinyl Bond Content) of Rubber-Like Polymer (A) Before Hydrogenation)

As a sample, 50 mg of a rubber-like polymer before hydrogenation was dissolved in 10 mL of carbon disulfide to obtain a measurement sample.

An infrared spectrum was measured in a range of 600 to 1000 $cm^{-1}$ with a solution cell used, and based on an absorbance at a prescribed wavelength, a microstructure of a butadiene portion, namely, a 1,2-vinyl bond content (% by mol), was obtained in accordance with an equation of Hampton's method (a method described in R. R. Hampton, Analytical Chemistry 21, 923 (1949)).

As a measuring apparatus, a Fourier transform infrared spectrophotometer "FT-IR230" manufactured by JASCO Corporation was used.

(Content of Styrene Block in Rubber-like Polymer (A))

Assuming that a chain of eight or more styrene structure units is defined as a styrene block, the content was obtained as follows.

Based on a $^1$H-NMR spectrum at 400 MHz measured with deuterated chloroform used as a solvent, a ratio of an integrated value of the following (a) in each chemical shift range was obtained, and thus, the content of the styrene block contained in the rubber-like polymer was obtained.

(a) Chain of eight or more aromatic vinyl compounds: 6.00≤S<6.68

(Iodine Value of Rubber-Like Polymer (A))

The iodine value of a rubber-like polymer (A) was calculated in accordance with a method described in "JIS K 0070: 1992".

(Amount of Bound Styrene (after Hydrogenation), Ethylene Structure, and Conjugated Diene Monomer Unit Content in Rubber-Like Polymer (A))

A rubber-like polymer (A) was used as a sample to measure, by $^1$H-NMR measurement, an amount of bound styrene (after hydrogenation), an ethylene structure, and a conjugated diene monomer unit. Measurement conditions for the $^1$H-NMR measurement were as follows:

<Measurement Conditions>
Apparatus: JNM-LA400 (manufactured by JEOL Ltd.)
Solvent: deuterated chloroform
Measurement sample: rubber-like polymer
Sample concentration: 50 mg/mL
Observation frequency: 400 MHz
Chemical shift reference: TMS (tetramethylsilane)
Pulse delay: 2.904 sec
Number of scans: 64
Pulse width: 45°
Measurement temperature: 26° C.

[Physical Properties of Rubber Composition]

(Metal Contents (Al Content and Ti Content) in Rubber Composition)

A rubber composition obtained in each of the Examples and Comparative Examples described below was measured, through elemental analysis using inductivity coupled plasma (ICP, Inductively Coupled Plasma, name of apparatus: ICPS-7510, manufactured by Shimadzu Corporation), for an aluminum content (Al content, in ppm) and a titanium content (Ti content, in ppm) in the rubber composition.

(Water Content of Rubber Composition)

A water content of a rubber composition was obtained by putting 50 g of the rubber composition in a hot air dryer heated to 150° C. to be dried for 3 hours to measure a mass difference of the rubber composition caused by the drying.

[Evaluation of Molded Article of Rubber Composition]

(Method for Desolvating Rubber Composition Solution)

<Desolvation Conditions 1>

Assuming steam stripping, a 50 L vessel was charged with 20 L of hot water at 90° C., and under stirring at a rotation speed of 1,000 rpm with a homogenizer (Homo Mixer MARK II (trade name, manufactured by Primix Corporation, 0.2 kW)), a polymer solution was added thereto in a dropwise manner for 30 minutes at a rate of 200 g/min. After completing the dropwise addition, the stirring was continued for 30 minutes, and thus, desolvation was performed. A crumb of the rubber composition generated in the hot water was dried to obtain a crumb of the rubber composition.

<Desolvation Conditions 2>

Assuming steam stripping, a 50 L vessel was charged with 20 L of hot water at 90° C., and under stirring at a rotation speed of 12,000 rpm with a homogenizer (Homo Mixer MARK II (trade name, manufactured by Primix Corporation, 0.2 kW)), a polymer solution was added thereto in a dropwise manner for 30 minutes at a rate of 200 g/min. After completing the dropwise addition, the stirring was continued for 30 minutes, and thus, desolvation was performed. A crumb of the rubber composition generated in the hot water was dried to obtain a crumb of the rubber composition.

(Method for Molding Bale of Rubber Composition)

The crumb prepared as described above was warmed to 60° C., then filled in a rectangular parallelepiped vessel having a length of 210 mm, a width of 105 mm, and a depth of 200 mm, and compressed by applying a pressure of 3.5 MPa with a cylinder over 10 seconds to obtain a bale of the rubber composition.

(Evaluation: Resistance to Mooney Viscosity Increase of Rubber Composition)

A Mooney viscosity of a rubber composition was measured under the following conditions.

The Mooney viscosity was measured with a Mooney viscometer (trade name "VR1132" manufactured by Ueshima Seisakusho Co., Ltd.) using an L rotor in accordance with ISO 289.

A measurement temperature was set to 100° C.

First, a sample was preheated for 1 minute at the test temperature, the rotor was rotated at 2 rpm, and torque was measured after 4 minutes to be defined as a Mooney viscosity ($ML_{(1+4)}$).

A difference between a Mooney viscosity measured within 4 hours after obtaining the rubber composition and a Mooney viscosity obtained after storing the rubber composition for 1 month at 25° C. and a humidity of 30% was determined as ΔML to be evaluated.

ΔML of 0 or more and less than 4 was evaluated as ⊚, ΔML of 4 or more and less than 8 was evaluated as ◯, ΔML of 8 or more and less than 15 was evaluated as Δ, and ΔML of 15 or more was evaluated as X.

For practical use, ΔML needs to be less than 15, and is preferably less than 8.

(Evaluation: Mold Contamination Resistance)

In molding a molded bale ten times under the above-described conditions, the number of times when the metal or crumb adhered to the rectangular parallelepiped vessel in a total amount of 5 g or more was evaluated. When the number of times when the metal or crumb adhered in a total amount of 5 g or more was 0 (zero), the contamination resistance was evaluated as ⊚, when the number was one or two, the contamination resistance was evaluated as ◯, when the number was three or four, the contamination resistance was evaluated as Δ, and when the number was five or more, the contamination resistance was evaluated as X. For practical use, the number needs to be four or less, and is preferably two or less.

(Evaluation: Peeling Resistance of Rubber Composition from Molded Bale)

A molded bale molded under the above-described conditions was used to obtain an amount of a crumb peeled off from the molded bale by a bale drop test.

Specifically, the molded bale was vertically dropped from a height of 100 cm onto a concrete floor, and the amount of the crumb thus peeled off from the molded bale was measured.

The amount of the thus peeled crumb is preferably smaller because the amount of the crumb peeled off from the molded bale in process following the molding in actual production process is thus made also small.

When the amount was less than 0.05% by mass of the whole molded bale, the peeling resistance was evaluated as ⊚, when the amount was 0.05% by mass or more and less than 0.1% by mass, the peeling resistance was evaluated as ◯, when the amount was 0.01% by mass or more and less than 0.2% by mass, the peeling resistance was evaluated as Δ, and when the amount was 0.2% by mass or more, the peeling resistance was evaluated as X.

For practical use, the amount needs to be less than 0.2% by mass, and is preferably less than 0.1% by mass.

(Evaluation: Adhesiveness of Packaging Sheet to Molded Bale)

A polyethylene film was caused to adhere to an iron plate, and the molded bale was placed on the polyethylene film. After the resultant was allowed to stand at an ambient temperature of 25° C. and a humidity of 50% for 72 hours with a load of 5 kg applied thereto, adhesiveness between the polyethylene film and the molded bale was evaluated.

Specifically, the iron plate was gradually inclined from the state where the molded bale was allowed to stand on the iron plate, and the iron plate was ultimately inclined to an angle of 90 degrees between the iron plate and the ground, and was allowed to stand in this inclined state.

In a case where the molded bale did not drop for 10 seconds or more in the state where the angle between the ground and the iron plate was 90 degrees, the adhesiveness was evaluated as ⊚. In a case where the molded bale dropped in 1 second or more and less than 10 seconds in the state where the angle between the ground and the iron plate was 90 degrees, the adhesiveness was evaluated as ◯. In a case where the molded bale dropped when the angle between the ground and the iron plate was 75 degrees or more and less than 90 degrees, or in a case where the molded bale dropped within 1 second after the angle became 90 degrees, the adhesiveness was evaluated as Δ. In a case where the molded bale dropped when the angle between the ground and the iron plate was 0 degree or more and less than 75 degrees, the adhesiveness was evaluated as X.

For practical use, it is necessary that the molded bale does not drop until the angle between the ground and the iron plate becomes 75 degrees or more.

[Preparation of Hydrogenation Catalyst, Rubber-like Polymer (A), and Rubber Composition]

(Preparation of Hydrogenation Catalyst)

A hydrogenation catalyst used in preparing a rubber-like polymer in each of the Examples and Comparative Examples described below was prepared as follows.

Production Example 1

A nitrogen-substituted reaction vessel was charged with 2 L of dried and purified cyclohexane, and 40 mmol of bis(η5-cyclopentadienyl)titanium di-(p-tolyl) and 150 g of 1,2-polybutadiene (1,2-vinyl bond content: about 85%) having a molecular weight of about 1,000 were dissolved therein. Thereafter, a cyclohexane solution containing 60 mmol of n-butyllithium was added to the reaction vessel to cause a reaction at room temperature for 5 minutes, and immediately after this, 40 mmol of n-butanol was added thereto, and the resultant was stirred to obtain a hydrogenation catalyst (TC-1). The thus obtained catalyst was stored at room temperature.

Production Example 2

A nitrogen-substituted reaction vessel was charged with 1 L of dried and purified cyclohexane, and 100 mmol of bis(η5-cyclopentadienyl)titanium dichloride was added thereto. Under sufficient stirring, a n-hexane solution containing 200 mmol of trimethyl aluminum was added thereto to be reacted for about 3 days at room temperature, and thus, a hydrogenation catalyst (TC-2) was obtained.

(Polymerization of Rubber-like Polymer (A))

(Polymerization Example 1) Rubber-Like Polymer (S) Before Hydrogenation

A temperature-controllable autoclave having an internal capacity of 40 L and equipped with a stirrer and a jacket was used as a reactor. The reactor was charged with 2,160 g of 1,3-butadiene, 300 g of styrene, and 21,000 g of cyclohexane, from which impurities had been precedently removed, and 30 mmol of tetrahydrofuran (THF) and 3.6 mmol of 2,2-bis(2-oxolanyl)propane used as polar substances, and the internal temperature of the reactor was kept at 46° C.

As a polymerization initiator, 23.9 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 76° C. Two minutes after reaching this reaction temperature peak, 9.0 mmol of N-benzylidene-3-(trimethoxysilyl)-1-propanamine (compound 1) was added to the reactor to perform a coupling reaction for 20 minutes. To the thus obtained polymer solution, 5.5 mmol of methanol used as a reaction terminator was added to obtain a rubber-like polymer solution (SS).

A part of the rubber-like polymer solution before hydrogenation was extracted to be desolvated with a dryer, and thus, a rubber-like polymer (S) before hydrogenation was obtained.

Analysis results are shown in Table 1.

(Polymerization Example 2) Rubber-Like Polymer (T) Before Hydrogenation

A temperature-controllable autoclave having an internal capacity of 40 L and equipped with a stirrer and a jacket was used as a reactor. The reactor was charged with 2,100 g of 1,3-butadiene, 780 g of styrene, and 21,000 g of cyclohexane, from which impurities had been precedently removed, and 30 mmol of tetrahydrofuran (THF) and 15.4 mmol of 2,2-bis(2-oxolanyl)propane used as polar substances, and the internal temperature of the reactor was kept at 42° C.

As a polymerization initiator, 21.1 mmol of n-butyllithium was supplied to the reactor.

After starting a polymerization reaction, the temperature within the reactor started to increase due to heat generation through polymerization, and after monomer conversion within the reactor reached 98%, 120 g of 1,3-butadiene was added to cause a reaction.

The temperature within the reactor finally reached 78° C. Two minutes after reaching this reaction temperature peak, 7.9 mmol of N-benzylidene-3-(trimethoxysilyl)-1-propanamine (compound 1) was added to the reactor to perform a coupling reaction for 20 minutes. To the thus obtained polymer solution, 4.8 mmol of methanol used as a reaction terminator was added to obtain a rubber-like polymer solution (TS).

A part of the rubber-like polymer solution before hydrogenation was extracted to be desolvated with a dryer, and thus, a rubber-like polymer (T) before hydrogenation was obtained.

Analysis results are shown in Table 1.

(Polymerization Example 3) Rubber-Like Polymer (U) Before Hydrogenation

A temperature-controllable autoclave having an internal capacity of 40 L and equipped with a stirrer and a jacket was used as a reactor. The reactor was charged with 450 g of styrene, and 21,000 g of cyclohexane, from which impurities had been precedently removed, and 30 mmol of tetrahydrofuran (THF) and 6.2 mmol of 2,2-bis(2-oxolanyl)propane used as polar substances, and the internal temperature of the reactor was kept at 44° C.

As a polymerization initiator, 24.4 mmol of n-butyllithium was supplied to the reactor.

After starting a polymerization reaction, the temperature within the reactor started to increase due to heat generation through polymerization, and after monomer conversion within the reactor reached 98%, 2,220 g of 1,3-butadiene was added, and 1 minute after completing the addition, 120 g of styrene was added to cause a reaction.

The temperature within the reactor finally reached 78° C. Two minutes after reaching this reaction temperature peak, 9.1 mmol of N-benzylidene-3-(trimethoxysilyl)-1-propanamine (compound 1) was added to the reactor to perform a coupling reaction for 20 minutes. To the thus obtained polymer solution, 5.6 mmol of methanol used as a reaction terminator was added to obtain a rubber-like polymer solution (US).

A part of the rubber-like polymer solution (US) before hydrogenation was extracted to be desolvated with a dryer, and thus, a rubber-like polymer (U) before hydrogenation was obtained.

Analysis results are shown in Table 1.

(Polymerization Example 4) Rubber-Like Polymer (V) Before Hydrogenation

A temperature-controllable autoclave having an internal capacity of 40 L and equipped with a stirrer and a jacket was used as a reactor. The reactor was charged with 3,000 g of 1,3-butadiene, and 21,000 g of cyclohexane, from which impurities had been precedently removed, and 30 mmol of tetrahydrofuran (THF) and 4.5 mmol of 2,2-bis(2-oxolanyl)propane used as polar substances, and the internal temperature of the reactor was kept at 41° C.

As a polymerization initiator, 30.0 mmol of n-butyllithium was supplied to the reactor.

After starting a polymerization reaction, the temperature within the reactor started to increase due to heat generation through polymerization, and the temperature within the reactor finally reached 80° C. Two minutes after reaching this reaction temperature peak, 11.2 mmol of N-benzylidene-3-(trimethoxysilyl)-1-propanamine (compound 1) was added to the reactor to perform a coupling reaction for 20 minutes. To the thus obtained polymer solution, 6.9 mmol of methanol used as a reaction terminator was added to obtain a rubber-like polymer solution (VS).

A part of the rubber-like polymer solution before hydrogenation was extracted to be desolvated with a dryer, and thus, a rubber-like polymer (V) before hydrogenation was obtained.

Analysis results are shown in Table 1.

(Polymerization Example 5) Rubber-Like Polymer (W) Before Hydrogenation

A temperature-controllable autoclave having an internal capacity of 40 L and equipped with a stirrer and a jacket was used as a reactor. The reactor was charged with 2,160 g of 1,3-butadiene, 300 g of styrene, and 21,000 g of cyclohexane, from which impurities had been precedently removed, and 30 mmol of tetrahydrofuran (THF) and 1.4 mmol of 2,2-bis(2-oxolanyl)propane used as polar substances, and the internal temperature of the reactor was kept at 48° C.

As a polymerization initiator, 12.2 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 73° C. Two minutes after reaching this reaction temperature peak, 4.5 mmol of N-benzylidene-3-(trimethoxysilyl)-1-propanamine (compound 1) was added to the reactor to perform a coupling reaction for 20 minutes. To the thus obtained polymer solution, 3.0 mmol of methanol used as a reaction terminator was added to obtain a rubber-like polymer solution (WS).

A part of the rubber-like polymer solution before hydrogenation was extracted to be desolvated with a dryer, and thus, a rubber-like polymer (W) before hydrogenation was obtained.

Analysis results are shown in Table 1.

(Polymerization Example 6) Rubber-Like Polymer (X) Before Hydrogenation

A temperature-controllable autoclave having an internal capacity of 40 L and equipped with a stirrer and a jacket was used as a reactor. The reactor was charged with 2,160 g of 1,3-butadiene, 300 g of styrene, and 21,000 g of cyclohexane, from which impurities had been precedently removed, and 30 mmol of tetrahydrofuran (THF) and 3.6 mmol of 2,2-bis(2-oxolanyl)propane used as polar substances, and the internal temperature of the reactor was kept at 46° C.

As a polymerization initiator, 23.9 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 76° C. Two minutes after reaching this reaction temperature peak, 9.0 mmol of trimethoxymethylsilane (compound 2) was added to the reactor to perform a coupling reaction for 20 minutes. To the thus obtained polymer solution, 5.5 mmol of methanol used as a reaction terminator was added to obtain a rubber-like polymer solution (XS).

A part of the rubber-like polymer solution before hydrogenation was extracted to be desolvated with a dryer, and thus, a rubber-like polymer (X) before hydrogenation was obtained.

Analysis results are shown in Table 1.

(Preparation of Rubber Composition)

(Example 1) Rubber Composition (SH-1)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-1) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-1).

Analysis results are shown in Table 2.

(Example 2) Rubber Composition (SH-2)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 100 minutes, and thus, a rubber-like polymer (S-2) was obtained. The rubber-like polymer thus obtained had an iodine value of 38.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-2).

Analysis results are shown in Table 2.

(Example 3) Rubber Composition (SH-3)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 110 ppm per 100 parts by mass of the rubber-like polymer before hydrogenation, followed by a hydrogenation reaction at a hydrogen pressure of 0.8 MPa and an average temperature of 90° C. for 50 minutes, and thus, a rubber-like polymer (S-3) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-3).

Analysis results are shown in Table 2.

(Example 4) Rubber Composition (SH-4)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 60 ppm per 100 parts by mass of the rubber-like polymer before hydrogenation, followed by a hydrogenation reaction at a hydrogen pressure of 0.8 MPa and an average temperature of 85° C. for 60 minutes, and thus, a rubber-like polymer (S-4) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 2>, and the resultant was dried with a dryer to obtain a rubber composition (SH-4).

Analysis results are shown in Table 2.

(Example 5) Rubber Composition (TH-1)

To the rubber-like polymer solution (TS) before hydrogenation obtained as described above (Polymerization Example 2), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 60 minutes, and thus, a rubber-like polymer (T-1) was obtained. The rubber-like polymer thus obtained had an iodine value of 70.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (TH-1).

Analysis results are shown in Table 2.

(Example 6) Rubber Composition (SH-5)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 100 minutes, and thus, a rubber-like polymer (S-5) was obtained. The rubber-like polymer thus obtained had an iodine value of 38.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and simultaneously, 150 g of SRAE oil (JOMO Process NC140, manufactured by JX Nippon Oil & Energy Corporation) was added and mixed. Thereafter, 6,000 g of the resultant rubber composition solution was desolvated by the method described in <Desolvation Conditions 1>, and the resultant was dried with a dryer to obtain a rubber composition (SH-5).

Analysis results are shown in Table 2.

(Example 7) Rubber Composition (SH-6)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-6) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and simultaneously, 6 g of stearic acid was added thereto. Thereafter, 6,000 g of the resultant rubber composition solution was desolvated by the method described in <Desolvation Conditions 1>, and the resultant was dried with a dryer to obtain a rubber composition (SH-6).

Analysis results are shown in Table 3.

(Example 8) Rubber Composition (SH-7)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-7) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer but was dried merely for a half of the drying time described above (Example 1) to obtain a rubber composition (SH-7).

Analysis results are shown in Table 3.

(Example 9) Rubber Composition (TH-2)

To the rubber-like polymer solution (TS) before hydrogenation obtained as described above (Polymerization Example 2), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 40 minutes, and thus, a rubber-like polymer (T-2) was obtained. The rubber-like polymer thus obtained had an iodine value of 129.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (TH-2).

Analysis results are shown in Table 3.

(Example 10) Rubber Composition (SH-8)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 69 ppm per 100 parts by mass of the rubber-like polymer before hydrogenation, and the hydrogenation catalyst (TC-2) prepared as described above (Production Example 2) was further added in an amount, in terms of titanium, of 1 ppm (2 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-8) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 2>, and the resultant was dried with a dryer to obtain a rubber composition (SH-8).

Analysis results are shown in Table 3.

(Example 11) Rubber Composition (WH-1)

To the rubber-like polymer solution (WS) before hydrogenation obtained as described above (Polymerization Example 5), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 80° C. for 70 minutes, and thus, a rubber-like polymer (W-1) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and simultaneously, 1,050 g of SRAE oil (JOMO Process NC140, manufactured by JX Nippon Oil & Energy Corporation) was added thereto to be mixed. Thereafter, 6,000 g of the resultant rubber composition solution was desolvated by the method described in <Desolvation Conditions 1>, and the resultant was dried with a dryer to obtain a rubber composition (WH-1).

Analysis results are shown in Table 3.

(Example 12) Rubber Composition (XH-1)

To the rubber-like polymer solution (XS) before hydrogenation obtained as described above (Polymerization Example 6), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 80° C. for 70 minutes, and thus, a rubber-like polymer (X-1) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (XH-1).

Analysis results are shown in Table 3.

(Comparative Example 1) Rubber Composition (SH-9)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 66 ppm per 100 parts by mass of the rubber-like polymer before hydrogenation, and the hydrogenation catalyst (TC-2) prepared as described above (Production Example 2) was further added in an amount, in terms of titanium, of 4 ppm (8 ppm in terms of aluminum) per 100 parts by mass of the rubber-like polymer before hydrogenation, followed by a hydrogenation reaction at a hydrogen pressure of 0.8 MPa and an average temperature of 85° C. for 50 minutes, and thus, a rubber-like polymer (S-9) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-9).

Analysis results are shown in Table 4.

(Comparative Example 2) Rubber Composition (SH-10)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 150 ppm per 100 parts by mass of the rubber-like polymer before hydrogenation, followed by a hydrogenation reaction at a hydrogen pressure of 0.8 MPa and an average temperature of 90° C. for 40 minutes, and thus, a rubber-like polymer (S-10) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (SH-10).

Analysis results are shown in Table 4.

(Comparative Example 3) Rubber Composition (TH-3)

To the rubber-like polymer solution (TS) before hydrogenation obtained as described above (Polymerization Example 2), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 40 minutes, and thus, a rubber-like polymer (T-3) was obtained. The rubber-like polymer thus obtained had an iodine value of 156.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (TH-3).

Analysis results are shown in Table 4.

(Comparative Example 4) Rubber Composition (UH-1)

To the rubber-like polymer solution (US) before hydrogenation obtained as described above (Polymerization Example 3), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.8 MPa and an average temperature of 85° C. for 60 minutes, and thus, a rubber-like polymer (U-1) was obtained. The rubber-like polymer thus obtained had an iodine value of 70.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (UH-1).

Analysis results are shown in Table 4.

(Comparative Example 5) Rubber Composition (VH-1)

To the rubber-like polymer solution (VS) before hydrogenation obtained as described above (Polymerization Example 4), the hydrogenation catalyst (TC-1) prepared as described above (Production Example 1) was added in an amount, in terms of titanium, of 70 ppm per 100 parts by mass of the rubber-like polymer before hydrogenation, followed by a hydrogenation reaction at a hydrogen pressure of 0.9 MPa and an average temperature of 85° C. for 120 minutes, and thus, a rubber-like polymer (V-1) was obtained. The rubber-like polymer thus obtained had an iodine value of 9.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 1>, and the resultant was dried with a dryer to obtain a rubber composition (VH-1).

Analysis results are shown in Table 4.

(Comparative Example 6) Rubber Composition (SH-11)

To the rubber-like polymer solution (SS) before hydrogenation obtained as described above (Polymerization Example 1), the hydrogenation catalyst (TC-1) prepared as described above (Production Example 1) was added in an amount, in terms of titanium, of 8 ppm per 100 parts by mass of the rubber-like polymer before hydrogenation, followed by a hydrogenation reaction at a hydrogen pressure of 1.8 MPa and an average temperature of 75° C. for 200 minutes, and thus, a rubber-like polymer (S-11) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. Thereafter, 6,000 g of the resultant rubber composition solution was desolvated by the method described in <Desolvation Conditions 2>, and the resultant was dried with a dryer to obtain a rubber composition (SH-11).

Analysis results are shown in Table 4.

(Comparative Example 7) Rubber Composition (SH-12)

To the rubber-like polymer solution (SS) before hydrogenation obtained as described above (Polymerization Example 1), the hydrogenation catalyst (TC-2) prepared as described above (Production Example 2) was added in an amount, in terms of titanium, of 100 ppm per 100 parts by mass of the rubber-like polymer before hydrogenation, followed by a hydrogenation reaction at a hydrogen pressure of 0.8 MPa and an average temperature of 90° C. for 30 minutes, and thus, a rubber-like polymer (S-12) was obtained. The rubber-like polymer thus obtained had an iodine value of 85.

To a solution of the thus obtained rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants. In addition, N-pyridine oxide dissolved in 2 fold mol of ethanol was added thereto, and an aqueous solution obtained by dissolving 2 fold mol of citric acid, based on a metal residue, in water having a double volume of the polymer solution was added thereto, and the resultant was mixed with a rotary disperser having an engagement structure (Cavitron 1010, manufactured by Nikko Kogyo Co., Ltd.) at 60° C. and 7600 rpm for 1 second to obtain a mixture. A P/V value and a peripheral speed employed at this point were respectively $25 \times 10^4$ kw/m$^3$ and 28 m/s. Thereafter, the resultant mixture was fed to a tank heated to 60° C., and retained there for 5 minutes to separate a polymer solution phase and a water phase. The water phase was removed, and then the polymer solution was vacuum dried to obtain a rubber composition (SH-12). This desolvation method is shown as <Desolvation Conditions 3> in Table 4.

Analysis results are shown in Table 4.

TABLE 1

|  |  | Polymerization Example 1 | Polymerization Example 2 | Polymerization Example 3 | Polymerization Example 4 | Polymerization Example 5 | Polymerization Example 6 |
|---|---|---|---|---|---|---|---|
| Rubber-like Polymer before Hydrogenation |  | S | T | U | V | W | X |
| Weight Average Molecular Weight | ten thousand | 42 | 39 | 35 | 37 | 74 | 44 |
| Polymer Mooney Viscosity |  | 41 | 39 | 54 | 42 | 107 | 39 |
| Modifier |  | Compound 1 | Compound 1 | Compound 1 | Compound 1 | Compound 1 | Compound 2 |
| Amount of Bound Styrene | wt % | 10 | 26 | 26 | 0 | 10 | 10 |
| 1,2-Vinyl Bond Content | mol % | 37 | 55 | 40 | 40 | 37 | 37 |

Compounds 1 and 2 shown as modifiers in Table 1 are as follows:
Compound 1: N-benzylidene-3-(trimethoxysilyl)-1-propanamine
Compound 2: trimethoxymethylsilane

TABLE 2

|  |  | Example 1 | Example 2 | Example 3 | Example 4 | Example 5 | Example 6 |
|---|---|---|---|---|---|---|---|
| Rubber-like Polymer before Hydrogenation |  | S | S | S | S | T | S |
| Rubber-like Polymer |  | S-1 | S-2 | S-3 | S-4 | T-1 | S-5 |
| Hydrogenation Catalyst |  | TC-1 | TC-1 | TC-1 | TC-1 | TC-1 | TC-1 |
| Desolvation Conditions |  | 1 | 1 | 1 | 2 | 1 | 1 |
| Rubber Composition |  | SH-1 | SH-2 | SH-3 | SH-4 | TH-1 | SH-5 |
| Oil | phr | 0 | 0 | 0 | 0 | 0 | 5 |

TABLE 2-continued

|  |  | Example 1 | Example 2 | Example 3 | Example 4 | Example 5 | Example 6 |
|---|---|---|---|---|---|---|---|
| Stearic Acid | phr | 0 | 0 | 0 | 0 | 0 | 0 |
| Amount of Bound Styrene | mass % | 10 | 10 | 10 | 10 | 26 | 10 |
| Amount of Styrene Block | mass % | 1.6 | 2.1 | 1.6 | 1.6 | 1.6 | 1.6 |
| Iodine Value | I g/100 | 85 | 30 | 85 | 85 | 70 | 38 |
| Ethylene Structure | mass % | 40.6 | 49.8 | 40.4 | 40.4 | 20.5 | 49.8 |
| Conjugated Diene Monomer Unit | mass % | 17.7 | 7.2 | 18.0 | 18.0 | 14.8 | 7.2 |
| Modification Ratio | % | 75 | 75 | 75 | 75 | 75 | 75 |
| Al Content | ppm | 0 | 0 | 0 | 0 | 0 | 0 |
| Ti Content | ppm | 50 | 50 | 90 | 20 | 50 | 48 |
| Water Content |  | 0.5 | 0.5 | 0.5 | 0.5 | 0.5 | 0.5 |
| Molded Form |  | Bale | Bale | Bale | Bale | Bale | Bale |
| Resistance to Mooney Viscosity Increase |  | ○ | ○ | ○ | ○ | ○ | ○ |
| Mold Contamination Resistance |  | ○ | ◎ | ◎ | Δ | ○ | ○ |
| Peeling Resistance of Rubber Composition from Molded Article |  | ○ | ◎ | Δ | ◎ | ◎ | ◎ |
| Adhesiveness of Packaging Sheet to Molded Article |  | ○ | Δ | Δ | ◎ | ○ | ○ |

TABLE 3

|  |  | Example 7 | Example 8 | Example 9 | Example 10 | Example 11 | Example 12 |
|---|---|---|---|---|---|---|---|
| Rubber-like Polymer before Hydrogenation |  | S | S | T | S | W | X |
| Rubber-like Polymer |  | S-6 | S-7 | T-2 | S-8 | W-1 | X-1 |
| Hydrogenation Catalyst |  | TC-1 | TC-1 | TC-1 | TC-1 + TC-2 | TC-1 | TC-1 |
| Desolvation Conditions |  | 1 | 1 | 1 | 2 | 1 | 1 |
| Rubber Composition |  | SH-6 | SH-7 | TH-2 | SH-8 | WH-1 | XH-1 |
| Oil | phr | 0 | 0 | 0 | 0 | 35 | 0 |
| Stearic Acid | phr | 0.2 | 0 | 0 | 0 | 0 | 0 |
| Amount of Bound Styrene | mass % | 10 | 10 | 26 | 10 | 10 | 10 |
| Amount of Styrene Block | mass % | 1.6 | 1.6 | 2.1 | 1.6 | 1.4 | 1.6 |
| Iodine Value | I g/100 | 85 | 85 | 129 | 85 | 85 | 85 |
| Ethylene Structure | mass % | 20.5 | 20.5 | 8.0 | 40.4 | 40.4 | 40.4 |
| Conjugated Diene Monomer Unit | mass % | 14.8 | 14.8 | 27.4 | 18.0 | 18.0 | 18.0 |
| Modification Ratio | % | 75 | 75 | 75 | 75 | 75 | 0 |
| Al Content | ppm | 0 | 0 | 0 | 1 | 0 | 0 |
| Ti Content | ppm | 50 | 50 | 50 | 50 | 55 | 50 |
| Water Content |  | 0.4 | 1.8 | 0.5 | 0.5 | 0.5 | 0.5 |
| Molded Form |  | Bale | Bale | Bale | Bale | Bale | Bale |
| Resistance to Mooney Viscosity Increase |  | ○ | ○ | ○ | Δ | Δ | ○ |
| Mold Contamination Resistance |  | ○ | ○ | Δ | ○ | Δ | ○ |
| Peeling Resistance of Rubber Composition from Molded Article |  | ◎ | ○ | Δ | ○ | ○ | Δ |
| Adhesiveness of Packaging Sheet to Molded Article |  | ○ | ○ | ◎ | ○ | ○ | ○ |

TABLE 4

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Rubber-like Polymer before Hydrogenation |  | A | A | T | U | V | A | A |
| Rubber-like Polymer |  | S-9 | S-10 | T-3 | U-1 | V-1 | S-11 | S-12 |
| Hydrogenation Catalyst |  | TC-1 + TC-2 | TC-1 | TC-1 | TC-1 | TC-1 | TC-1 | TC-2 |
| Desolvation Conditions |  | 1 | 1 | 1 | 1 | 1 | 2 | 3 |
| Rubber Composition |  | SH-9 | SH-10 | TH-3 | UH-1 | VH-1 | SH-11 | SH-12 |
| Oil | phr | 0 | 0 | 0 | 0 | 0 | 0 | 0 |
| Stearic Acid | phr | 0 | 0 | 0 | 0 | 0 | 0 | 0 |
| Amount of Bound Styrene | mass % | 10 | 10 | 26 | 26 | 0 | 10 | 10 |
| Amount of Styrene Block | mass % | 1.6 | 1.6 | 2.1 | 15 | 0 | 1.6 | 1.6 |
| Iodine Value | I g/100 | 85 | 85 | 156 | 70 | 9 | 85 | 85 |
| Ethylene Structure | mass % | 40.4 | 40.4 | 2.0 | 31.1 | 60.0 | 40.4 | 40.4 |
| Conjugated Diene Monomer Unit | mass % | 18.0 | 18.0 | 33.3 | 14.8 | 2.0 | 18.0 | 18 |
| Modification Ratio | % | 75 | 75 | 75 | 75 | 75 | 75 | 75 |

TABLE 4-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Al Content | ppm | 7 | 0 | 0 | 0 | 0 | 0 | 2 |
| Ti Content | ppm | 50 | 135 | 50 | 50 | 50 | 2 | 2 |
| Water Content |  | 0.5 | 0.5 | 0.5 | 0.5 | 0.5 | 0.5 | 0.5 |
| Molded Form |  | Bale | Bale | Bale | Bale | Bale | Bale | Bale |
| Resistance to Mooney Viscosity Increase |  | X | ◯ | ◯ | ◯ | Δ | ◯ | X |
| Mold Contamination Resistance |  | ◯ | ⊚ | X | ◯ | Δ | X | X |
| Peeling Resistance of Rubber Composition from Molded Article |  | ◯ | X | Δ | X | X | ⊚ | ◯ |
| Adhesiveness of Packaging Sheet to Molded Article |  | ◯ | X | ⊚ | ◯ | X | ⊚ | ◯ |

[Examples 13 to 15] and [Comparative Examples 8 to 11]

[Preparation and Evaluation of Physical Properties of Crosslinking Rubber Composition]

The rubber compositions SH-1 to SH-3, SH-9, TH-3, UH-1, and VH-1 of Examples 1 to 3 and Comparative Examples 1 and 3 to 5 shown in Tables 2 to 4 were used as raw material rubber components to obtain crosslinking rubber compositions containing respective raw material rubbers in accordance with the following compositions.

(Rubber Components)
Rubber composition (each of samples SH-1 to SH-3, SH-9, TH-3, UH-1, and VH-1): 80 parts by mass (parts by mass excluding a rubber softener)
High cis polybutadiene (trade name "UBEPOL BR150", manufactured by Ube Industries, Ltd.): 20 parts by mass (Blending Conditions)
The amount of each compounding agent added was expressed in parts by mass based on 100 parts by mass of the rubber component excluding a rubber softener.

Silica 1 (trade name "Ultrasil 7000GR" manufactured by Evonik Degussa, nitrogen adsorption specific surface area: 170 m$^2$/g): 50.0 parts by mass
Silica 2 (trade name "Zeosil Premium 200 MP" manufactured by Rhodia, nitrogen adsorption specific surface area: 220 m$^2$/g): 25.0 parts by mass
Carbon black (trade name "Seast KH (N339)" manufactured by Tokai Carbon Co., Ltd.): 5.0 parts by mass
Silane coupling agent (trade name "Si75" manufactured by Evonik Degussa, bis(triethoxysilylpropyl)disulfide): 6.0 parts by mass
SRAE oil (trade name "Process NC140" manufactured by JX Nippon Oil & Energy Corporation): 25.0 parts by mass
Zinc powder: 2.5 parts by mass
Stearic acid: 1.0 part by mass
Anti-aging agent (N-(1,3-dimethylbutyl)-N'-phenyl-p-phenylenediamine): 2.0 parts by mass
Sulfur: 2.2 parts by mass
Vulcanization accelerator 1 (N-cyclohexyl-2-benzothiazylsulfinamide): 1.7 parts by mass
Vulcanization accelerator 2 (diphenylguanidine): 2.0 parts by mass
Total: 222.4 parts by mass (Kneading Method)
The above-described materials were kneaded as follows to obtain a rubber composition.

A closed kneader (having an internal capacity of 0.3 L) equipped with a temperature controller was used to knead, as first stage kneading, the raw material rubber (any one of the samples SH-1 to SH-3, SH-9, TH-3, UH-1, and VH-1), the fillers (silica 1, silica 2, and carbon black), the silane coupling agent, the SRAE oil, zinc powder and stearic acid under conditions of a filling rate of 65% and a rotor speed of 30 to 50 rpm.

Here, the temperature of the closed mixer was controlled to obtain the rubber composition (compound) at a discharge temperature of 155 to 160° C.

Next, as second stage kneading, after the compound obtained as described above was cooled to room temperature, the anti-aging agent was added thereto, and the resultant was kneaded again for improving dispersibility of the silica. Also in this case, the discharge temperature of the compound was adjusted to 155 to 160° C. by the temperature control of the mixer.

After cooling, as third stage kneading, the resultant was kneaded with sulfur and the vulcanization accelerators 1 and 2 added thereto with an open roll set to 70° C. Thereafter, the resultant was molded, and vulcanized with a vulcanization press at 160° C. for 20 minutes.

The rubber composition before vulcanization and the rubber composition after the vulcanization were evaluated. Specifically, the evaluations were performed by the following methods.

Results are shown in Table 5.

(Evaluations 1 and 2) Wet Skid Resistance and Fuel Economy (Viscosity Parameter)

A viscosity tester "ARES" manufactured by Rheometric Scientific was used to measure a viscosity parameter in a twist mode.

A tan δ measured at 0° C., a frequency of 10 Hz, and a strain of 1% was used as an index of wet skid resistance. A larger index indicates better wet skid resistance.

A tan δ measured at 50° C., a frequency of 10 Hz, and a strain of 3% was used as an index of fuel economy. A smaller index indicates better fuel economy.

Table 5 shows, with the physical properties of the rubber composition (SH-9) of Comparative Example 1 used as references, signs corresponding to changes of the wet skid resistance and the fuel economy in the following ranges.

Δ: from deterioration by less than 5% to improvement by less than 5%
◯: from improvement by 5% or more to improvement by less than 15%
⊚: from improvement by 15% or more to improvement by less than 20%
X: deterioration by 5% or more (Evaluation 3) Fracture Property Breaking strength and elongation at break were measured in accordance with a tensile test method of JIS K6251. A product of measured values of the breaking strength and the elongation at break was defined as a fracture property.

Table 5 shows, with the physical property of the rubber composition (SH-9) of Comparative Example 1 used as a reference, signs corresponding to changes of the fracture property in the following ranges.
- Δ: from deterioration by less than 5% to improvement by less than 5%
- ◯: from improvement by 5% or more to improvement by less than 15%
- ◎: from improvement by 15% or more to improvement by less than 20%
- X: deterioration by 5% or more

TABLE 5

|  | Example 13 Compound Example 1 | Example 14 Compound Example 2 | Example 15 Compound Example 3 | Comparative Example 8 Compound Example 4 | Comparative Example 9 Compound Example 5 | Comparative Example 10 Compound Example 6 | Comparative Example 11 Compound Example 7 |
|---|---|---|---|---|---|---|---|
| Rubber Composition | SH-1 | SH-2 | SH-3 | SH-9 | TH-3 | UH-1 | VH-1 |
| Wet Skid Resistance | Δ | Δ | ◯ | Δ | Δ | Δ | X |
| Fuel Economy | Δ | Δ | Δ | Δ | X | X | ◯ |
| Fracture Property | Δ | Δ | ◎ | Δ | X | ◯ | X |

As shown in Tables 2 to 4, it was confirmed that the molded bales of the rubber compositions of Examples 1 to 12 are smaller in change of the Mooney viscosity over time, and excellent in the mold contamination resistance, the peeling resistance of the rubber composition from the molded bale, and the adhesiveness of a packaging sheet to the molded bale as compared with those of the Comparative Examples. It was also confirmed that since the increase of the Mooney viscosity is small, the physical properties are difficult to change over time, which stabilizes the quality. It was also confirmed that since a used mold is difficult to be contaminated, contamination is less caused by substances adhering to the mold during molding of a bale, and excellent production stability is obtained. It was also confirmed that since the rubber composition is difficult to be peeled off from the molded bale, the rubber composition is little peeled off after molding the bale, and hence excellent bale moldability and production stability are obtained. It was also confirmed that since a packaging sheet easily adheres to the molded bale, a gap between the packaging sheet and the bale is so small that condensation is difficult to occur, and excellent handleability in transport is also obtained.

Besides, as shown in Table 5, it was confirmed that the crosslinking rubber compositions using the rubber compositions of Examples 1 to 3 are equivalent or better in balance of the physical properties as compared with the crosslinking rubber composition using the rubber composition of Comparative Example 1, and that the crosslinking rubber compositions using the rubber compositions of the Comparative Examples 3 to 5 are inferior in the balance of the physical properties.

The molded bale of the rubber composition of the present invention is suitable as a constituent material of a crosslinking rubber composition, and specifically, is industrially applicable in the fields of tire members, interiors and exteriors of vehicles, anti-vibration rubbers, belts, shoes, foam materials, and various industrial products, and the like.

What is claimed is:

1. A molded bale of a rubber composition, comprising:
   a rubber-like polymer (A) comprising an iodine value of 10 to 250, 3% by mass or more of an ethylene structure, and less than 10% by mass of a vinyl aromatic monomer block, wherein the rubber-like polymer is a hydrogenated polymer obtained by hydrogenating some or most of double bonds of a rubber-like polymer obtained by polymerizing or copolymerizing at least a conjugated diene monomer unit, or a monomer unit having an unsaturated group; and
   titanium (C),
   wherein a content of the titanium (C) is 3 ppm or more and 120 ppm or less, and
   a content of aluminum (B) is less than 2 ppm.

2. The molded bale according to claim 1, wherein the rubber-like polymer (A) is a hydrogenated product of a conjugated diene-based polymer.

3. The molded bale according to claim 2, wherein the rubber-like polymer (A) comprises 5% by mass or more of a vinyl aromatic monomer unit.

4. The molded bale according to claim 3, wherein the rubber-like polymer (A) comprises a nitrogen atom.

5. The molded bale according to claim 3, wherein the rubber-like polymer (A) has a modification ratio measured by column adsorption GPC of 40% by mass or more.

6. The molded bale according to claim 2, wherein the rubber-like polymer (A) comprises a nitrogen atom.

7. The molded bale according to claim 2, wherein the rubber-like polymer (A) has a modification ratio measured by column adsorption GPC of 40% by mass or more.

8. The molded bale according to claim 1, wherein the rubber-like polymer (A) comprises 5% by mass or more of a vinyl aromatic monomer unit.

9. The molded bale according to claim 8, wherein the rubber-like polymer (A) comprises a nitrogen atom.

10. The molded bale according to claim 8, wherein the rubber-like polymer (A) has a modification ratio measured by column adsorption GPC of 40% by mass or more.

11. The molded bale according to claim 1, wherein the rubber-like polymer (A) comprises a nitrogen atom.

12. The molded bale according to claim 11, wherein the rubber-like polymer (A) has a modification ratio measured by column adsorption GPC of 40% by mass or more.

13. The molded bale according to claim 1, wherein the rubber-like polymer (A) has a modification ratio measured by column adsorption GPC of 40% by mass or more.

14. The molded bale according to claim 1, further comprising 1% by mass or more or 30% by mass or less of a rubber softener (D).

15. The molded bale according to claim 1, comprising 0.05% by mass or more and 1.5% by mass or less of water.

16. A crosslinking rubber composition, comprising:
   the rubber composition of the molded bale according to claim 1; and
   a crosslinking agent,
   wherein a content of the crosslinking agent is 0.1 parts by mass or more and 20 parts by mass or less based on 100 parts by mass of a rubber component.

17. A tread for a tire, comprising the rubber composition of the molded bale according to claim 1.

* * * * *